US012492424B2

(12) United States Patent
Chen et al.

(10) Patent No.: US 12,492,424 B2
(45) Date of Patent: Dec. 9, 2025

(54) COMPOSITIONS AND METHODS FOR DETECTING VIRAL NUCLEIC ACIDS

(71) Applicant: ARIZONA BOARD OF REGENTS ON BEHALF OF ARIZONA STATE UNIVERSITY, Scottsdale, AZ (US)

(72) Inventors: Shengxi Chen, Chandler, AZ (US); Sidney Hecht, Phoenix, AZ (US); Mingxuan Gao, Chongqing (CN)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 380 days.

(21) Appl. No.: 17/370,859

(22) Filed: Jul. 8, 2021

(65) Prior Publication Data
US 2021/0403983 A1 Dec. 30, 2021

Related U.S. Application Data

(63) Continuation of application No. 16/016,086, filed on Jun. 22, 2018, now abandoned.

(60) Provisional application No. 62/524,070, filed on Jun. 23, 2017.

(51) Int. Cl.
*C12Q 1/6888* (2018.01)
*C12Q 1/6806* (2018.01)
*C12Q 1/6818* (2018.01)
*C12Q 1/682* (2018.01)
*C12Q 1/686* (2018.01)
*C12Q 1/70* (2006.01)
*B82Y 5/00* (2011.01)

(52) U.S. Cl.
CPC ......... *C12Q 1/6806* (2013.01); *C12Q 1/6818* (2013.01); *C12Q 1/682* (2013.01); *C12Q 1/686* (2013.01); *C12Q 1/70* (2013.01); *B82Y 5/00* (2013.01); *C12N 2310/151* (2013.01)

(58) Field of Classification Search
CPC .................................................... C12Q 1/701
USPC ...................................................... 435/24.32
See application file for complete search history.

(56) References Cited

U.S. PATENT DOCUMENTS

| 4,559,157 | A | 12/1985 | Smith et al. |
| 4,608,392 | A | 8/1986 | Jacquet et al. |
| 4,820,508 | A | 4/1989 | Wortzman |
| 4,938,949 | A | 7/1990 | Borch et al. |
| 4,992,478 | A | 2/1991 | Geria |
| 6,652,285 | B1 * | 11/2003 | Breivik ............... G09B 23/26 434/278 |
| 6,773,885 | B1 | 8/2004 | Walder et al. |
| 7,439,341 | B2 | 10/2008 | Laikhter et al. |
| 8,658,780 | B2 | 2/2014 | Pierce et al. |
| 2010/0316613 | A1 * | 12/2010 | Upton ............... C12N 5/0606 435/405 |
| 2014/0323542 | A1 | 10/2014 | Han et al. |
| 2016/0266118 | A1 | 9/2016 | Cho et al. |

OTHER PUBLICATIONS

Tisza et al., "Discovery of several thousand highly diverse circular DNA viruses", eLIFE, Feb. 4, 2020, pp. 1-26. (Year: 2020).*
Sah et al., "Complete Genome Sequence of a 2019 Novel Coronavirus (SARS-CoV-2) Strain Isolated in Nepal", Microbiology, Mar. 12, 2020, vol. 9, No. 11, pp. 1-3. (Year: 2020).*
"New COVID-19 Variants", Centers for Disease Control and Prevention, Jan. 15, 2021, pp. 1-3. (Year: 2021).*
Song et al., "Dynamic modulation of DNA hybridization using allosteric DNA tetrahedron nanostructures", Analytical Chemistry, Jul. 20, 2016, 88, 8043-8049. (Year: 2016).*
"Tetrahedron", Wikipedia.com, accessed Oct. 2, 2023. (Year: 2023).*
Altschul, et al., "Basic local alignment search tool", J Mol Biol 215, 403-410 (1990).
Beaucage, et al., "Deoxynucleoside Phosphoramidites—A New Class of Key Intermediates for Deoxypolynucleotide Synthesis", Tet. Let 22(20), 1859-1862 (1981).
Callahan, et al., "Development and Evaluation of Serotype- and Group-Specific Fluorogenic Reverse Transcriptase PCR (TaqMan) Assays for Dengue Virus", J Clin Microbiol 39(11), 4119-4124 (2001).
Chen, et al., "A Duo-toehold-mediated displacement amplification on DNA tetrahedron for RNA detection of dengue virus", 13th International Conference on Pathology and Molecular Diagnosis (San Diego, CA, Jun. 26-27, 2017) 7(2 Supp), abstract (2017).
Corpet, et al., "Multiple sequence alignment with hierarchical clustering", Nucl Acids Res 16, 10881-10890 (1988).
Douglas, et al., "Self-assembly of DNA into nanoscale three-dimensional shapes", Nature 459(7245), 414-418 (2009).
Engelen, et al., "Antibody-controlled actuation of DNA-based molecular circuits", Nature 8, article 14473, 8 pages (2017).
Froehler, et al., "Synthesis of DNA via deoxynucleoside H-phosphonate intermediates", Nucl. Acid. Res. 14 (13), 5399-5407 (1986).
Fu, et al., "Full-length cDNA sequence of dengue type 1 virus (Singapore strain S275/90)", Virology 188(2), 953-958 (1992).
Gaffney, et al., "Large-Scale Oligonucleotide Synthesis by the H-Phosphonate Method", Tet. Let. 29 (22), 2619-2622 (1988).

(Continued)

Primary Examiner — Bradley L. Sisson
(74) Attorney, Agent, or Firm — Casimir Jones, S.C.; Anne M. Reynolds

(57) ABSTRACT

Described herein are compositions that may be used to detect viral nucleic acid. For example, these compositions may comprise a DNA-nanostructure, a capture oligonucleotide and a protector oligonucleotide, wherein the components are designed based on a duo-toehold-mediated displacement reaction (duo-TMDR) strategy. In this strategy, a first TMDR can switch off a Faster resonance energy transfer (FRET) process and a second TMDR can release the target viral nucleic acid and amplify the signal. Methods of using such compositions are also provided herein.

9 Claims, 11 Drawing Sheets
Specification includes a Sequence Listing.

(56) References Cited

OTHER PUBLICATIONS

Gao, et al., "Rapid detection of a dengue virus RNA sequence with single molecule sensitivity using tandem toehold-mediated displacement reactions", Chem Commun 54(8), 968-971 (2018).
Garegg, et al., "Nucleoside H-Phosphonates. III. Chemical Synthesis of Oligodeoxyribonucleotides by the Hydrogenphosphonate Approach", Tet. Let. 27 (34), 4051-4054 (1986).
Garegg, et al., "Nucleoside H-Phosphonates. IV. Automated Solid Phase Synthesis of Oligoribonucleotides by the Hydrogenphosphonate Approach", Tet. Let. 27 (34), 4055-4058 (1986).
Goodman, et al., "Reconfigurable, braced, threedimensional DNA nanostructures", Nat Nanotechnol 3(2), 93-96 (2008).
Gootenberg, et al., "Nucleic acid detection with CRISPR-Cas13a/C2c2", Science 356(6336), 438-442 (2017).
Halstead, et al., "Pathogenesis of dengue: challenges to molecular biology", Science 239(4839), 476-481 (1988).
He, et al., "Hierarchical self-assembly of DNA into symmetric supramolecular polyhedra", Nature 452, 198-201 (2008).
Higgins, et al., "Fast and sensitive multiple sequence alignments on a microcomputer", Comput Appl Biosci 5(2), 151-153 (1989).
Hu, et al., "Single-Molecule Analysis of Colorectal Cancer-associated MicroRNAs via a Biological Nanopore", Acta Chim Sinica 75(11), 1087-1090 (2017). [English Abstract].
Huang, et al., "Parallelization of a Local Similarity Search Algorithm", CABIOS 8, 155-166 (1992).
Karlin, et al., "Applications and statistics for multiple high-scoring segments in molecular sequences", Proc Natl Acad Sci 90, 5873-5877 (1993).
Karlin, et al., "Methods for assessing the statistical significance of molecular sequence features by using general scoring schemes", Proc Natl Acad Sci 87(6), 2264-2268 (1990).
Lanciotti, et al., "Rapid Detection and Typing of Dengue Viruses from Clinical Samples by Using Reverse Transcriptase-Polymerase Chain Reaction", J Clin Microbiol 30(3), 545-551 (1992).
Li, et al., "Dynamic DNA Assemblies Mediated by Binding-Induced DNA Strand Displacement", J Am Chem Soc, 135 (7), 2443-2446 (2013).
Li, et al., "Three-Input Majority Logic Gate and Multiple Input Logic Circuit Based on DNA Strand Displacement", Nano Lett 13(6), 2980-2988 (2013).
Myers, et al., "Optimal alignments in linear space", CABIOS 4(1), 11-17 (1988).
Needleman, et al., "A General Method Applicable to the Search for Similarities in the Amino Acid Sequence of Two Proteins", J Mol Biol 48, 443-453 (1970).
Ozhalici-Unal, et al., "Fluorescent DNA Nanotags Based on a Self-Assembled DNA Tetrahedron", ACS Nano 3(2), 425-433 (2009).
Pearson, et al., "Improved tools for biological sequence comparison", Proc Natl Acad Sci 85, 2444-2448 (1988).
Pearson, "Using the FASTA program to search protein and DNA sequence databases", Metho Mol Biol 24, 307-331 (1994).
Rothemund, "Folding DNA to create nanoscale shapes and patterns", Nature 440, 297-302 (2006).
Smith, et al., "Comparison of biosequences", Adv Appl Math 2(4), 482-489 (1981).
Song, et al., "Synchronized Assembly of Gold Nanoparticles Driven by a Dynamic DNA-Fueled Molecular Machine", J Am Chem Soc 134(26), 10803-10806 (2012).
Wang, et al., "Highly Selective Detection of Single-Nucleotide Polymorphisms Using a Quartz Crystal Microbalance Biosensor Based on the Toehold-Mediated Strand Displacement Reaction", Anal Chem 84(16), 7008-7014 (2012).
Weissleder, et al., "Shedding light onto live molecular targets", Nat Med 9(1), 123-128 (2003).
World Health Organization, "Dengue: Guidelines for Diagnosis, Treatment, Prevention and Control", World Health Organization, 160 pages (2009).
Yang, et al., "Regulation of DNA Strand Displacement Using an Allosteric DNA Toehold", J Am Chem Soc 138(42), 14076-14082 (2016).
Zhang, et al., "Complex wireframe DNA origami nanostructures with multi-arm junction vertices", Nat Nanotechnol 10 (9), 779-784 (2015).
Zhang, et al., "Control of DNA Strand Displacement Kinetics Using Toehold Exchange", J Am Chem Soc 131(47), 17303-17314 (2009).
Zhang, et al., "DNA-affibody nanoparticles for inhibiting breast cancer cells overexpressing HER2", Chem Commun 53(3), 573-576 (2017, available online 2016).
Zhang, et al., "Exterior modification of a DNA tetrahedron", Chem Commun 46(36), 6792-6794 (2010).
Zhang, et al., "Single molecule analysis of light-regulated RNA:spiropyran interactions", Chem Sci 5(7), 2642-2646 (2014).
Zhang, et al., "Structural DNA Nanotechnology: State of the Art and Future Perspective", J Am Chem Soc 136(32), 11198-11211 (2014).
Zhou, et al., "Liposome-Quantum Dot Complexes Enable Multiplexed Detection of Attomolar DNAs without Target Amplification", J Am Chem Soc 135(6), 2056-2059 (2013).
Zhu, et al., "A Novel Coronavirus from Patients with Pneumonia in China, 2019", The New England Journal of Medicine, 382; 8, Feb. 20, 2020, pp. 727-733. (Year: 2020).
"Dengue virus", Wikipedia.com, accessed Jul. 6, 2020. (Year: 2020).
"Human papillomavirus infection", Wikipedia.com, accessed Jul. 6, 2020. (Y.

* cited by examiner

COMPOSITIONS AND METHODS FOR DETECTING VIRAL NUCLEIC ACIDS

RELATED APPLICATIONS

This application is a continuation of U.S. application Ser. No. 16/016,086 filed on Jun. 22, 2018, which claims the benefit of priority of U.S. Provisional Application Ser. No. 62/524,070 filed on Jun. 23, 2017, which applications are incorporated by reference herein.

GOVERNMENT FUNDING

This invention was made with government support under W81XWH-16-1-0141 awarded by the ARMY/MRMC. The government has certain rights in the invention.

SEQUENCE LISTING

The instant application contains a Sequence Listing which has been filed electronically in ASCII format and is hereby incorporated by reference in its entirety. Said ASCII copy, created on Jul. 7, 2021, is named 39553-303_SEQUENCE_LISTING.txt and is 3,620 bytes in size.

BACKGROUND

RNA viruses, such as human immunodeficiency virus (HIV), dengue virus and Ebola virus, are some of the most rapidly spreading viral diseases in the world. For example, dengue currently threatens more than 2.5 billion people in more than 100 countries, including Africa, Americas, Western Pacific, Southeast Asia and Eastern Mediterranean, and causes more than 24,000 deaths annually. For RNA viral diseases, early-stage diagnosis and treatment is critical, as fatality rates are often high if severe symptoms occur. For example, a dengue virus infection can cause severe symptoms and may result in a fatality rate as high as 10% in the first week if a proper treatment is not performed. Reverse transcriptase polymerase chain reaction (RT-PCR) is the most commonly used method to detect viral RNA in a patient's blood, serum or plasma. However, RT-PCR is expensive and time-consuming and usually takes 1-2 days for results. Additionally, it is not suitable for use in remote areas, which may lead to inadequate treatments.

Accordingly, new compositions and methods for detecting viruses are needed (e.g., RNA viruses).

SUMMARY

Thus, as described herein, a novel duo-toehold-mediated displacement reaction (duo-TMDR) strategy using a DNA-nanostructure has been developed to amplify a signal and sensitively detect viral nucleic acids. In this strategy, a first TMDR can switch off a Förster resonance energy transfer (FRET) process and a second TMDR can release the target viral nucleic acid and amplify the signal. As described in the Example, as low as 6 copies of dengue RNA per sample could be detected by using a single molecule detecting technique.

Accordingly, certain embodiments of the invention provide a composition for detecting a viral nucleic acid in a sample, the composition comprising:

a DNA-nanostructure, a capture oligonucleotide and a protector oligonucleotide;

wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;

wherein the protector oligonucleotide is capable of hybridizing to the DNA-nanostructure;

wherein the viral nucleic acid is capable of displacing the protector oligonucleotide and hybridizing to the DNA-nanostructure; and wherein the capture oligonucleotide is capable of displacing the viral nucleic acid and hybridizing to the DNA-nanostructure but is not capable of displacing the protector oligonucleotide.

Certain embodiments of the invention also provide a method for detecting a viral nucleic acid in a sample, comprising:

a) contacting the sample with a detection agent and a capture oligonucleotide under conditions suitable for strand displacement, wherein the detection agent comprises a protector oligonucleotide hybridized to a DNA-nanostructure;

wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;

wherein the viral nucleic acid is capable of displacing the protector oligonucleotide and hybridizing to the DNA-nanostructure; and wherein the capture oligonucleotide is capable of displacing the viral nucleic acid and hybridizing to the DNA-nanostructure but is not capable of displacing the protector oligonucleotide; and b) measuring the fluorescent emission from the fluorophore, wherein an increase in fluorescent emission as compared to a control indicates the presence of a viral nucleic acid.

Certain embodiments of the invention also provide a DNA-tetrahedron comprising four oligonucleotides, wherein the oligonucleotides comprise a sequence having at least about 90% sequence identity to SEQ ID NO:1, SEQ ID NO:2, SEQ ID NO:3 and SEQ ID NO:4.

Certain embodiments of the invention provide a protector oligonucleotide comprising a nucleic acid sequence having at least about 90% sequence identity to SEQ ID NO:5, SEQ ID NO:6 or SEQ ID NO:7.

Certain embodiments of the invention provide a capture oligonucleotide comprising a nucleic acid sequence having at least about 90% sequence identity to SEQ ID NO:8, SEQ ID NO:9 or SEQ ID NO:10.

Certain embodiments of the invention provide a kit for detecting viral nucleic acid in a sample comprising:

a) a DNA-nanostructure;
b) a protector oligonucleotide;
c) a capture oligonucleotide; and
d) instructions for use;

wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;

wherein the protector oligonucleotide is capable of hybridizing to the DNA-nanostructure;

wherein the viral nucleic acid is capable of displacing the protector oligonucleotide and hybridizing to the DNA-nanostructure; and wherein the capture oligonucleotide is capable of displacing the viral nucleic acid and hybridizing to the DNA-nanostructure but is not capable of displacing the protector oligonucleotide.

DETAILED DESCRIPTION

Figure 1:
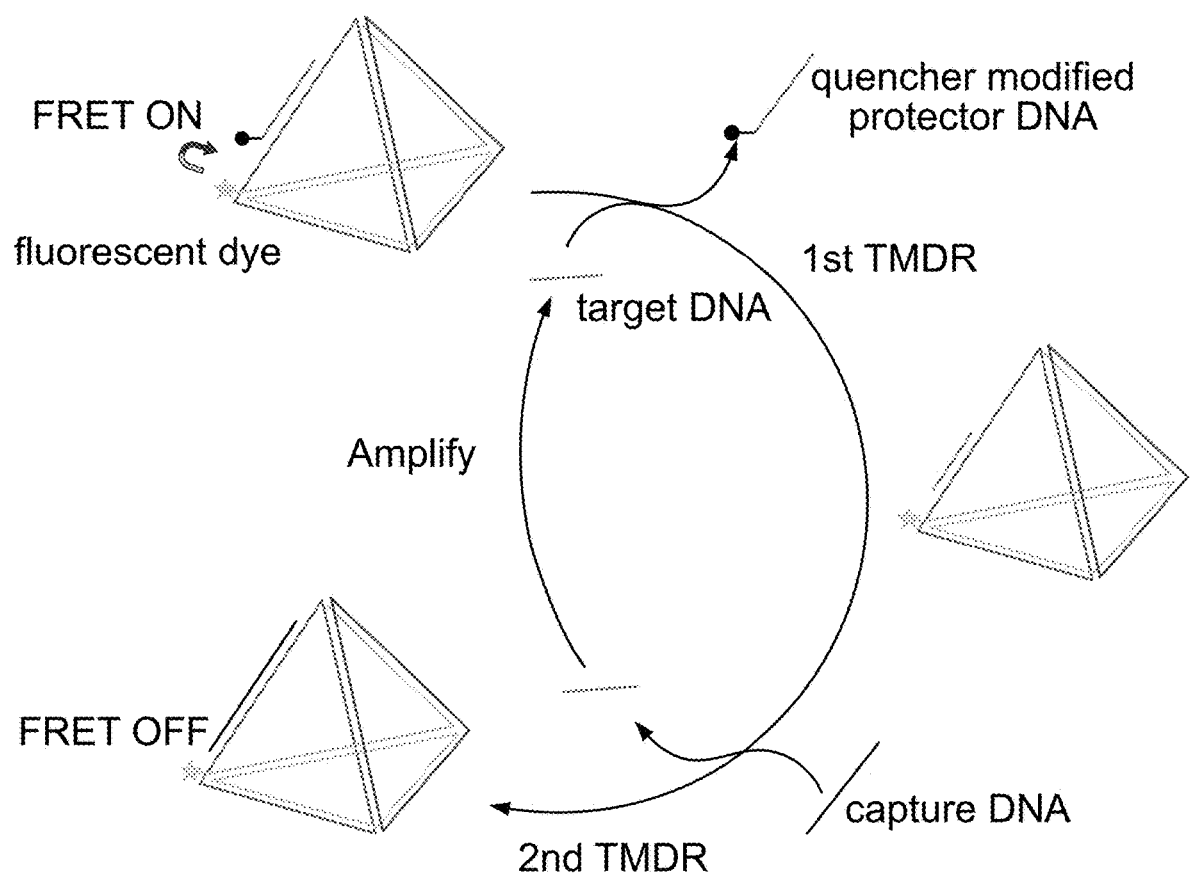
FIG. 1. The illustration of the duo-toehold-mediated strand displacement reaction (duo-TMDR) process for target oligonucleotide detection.
Figure 2:
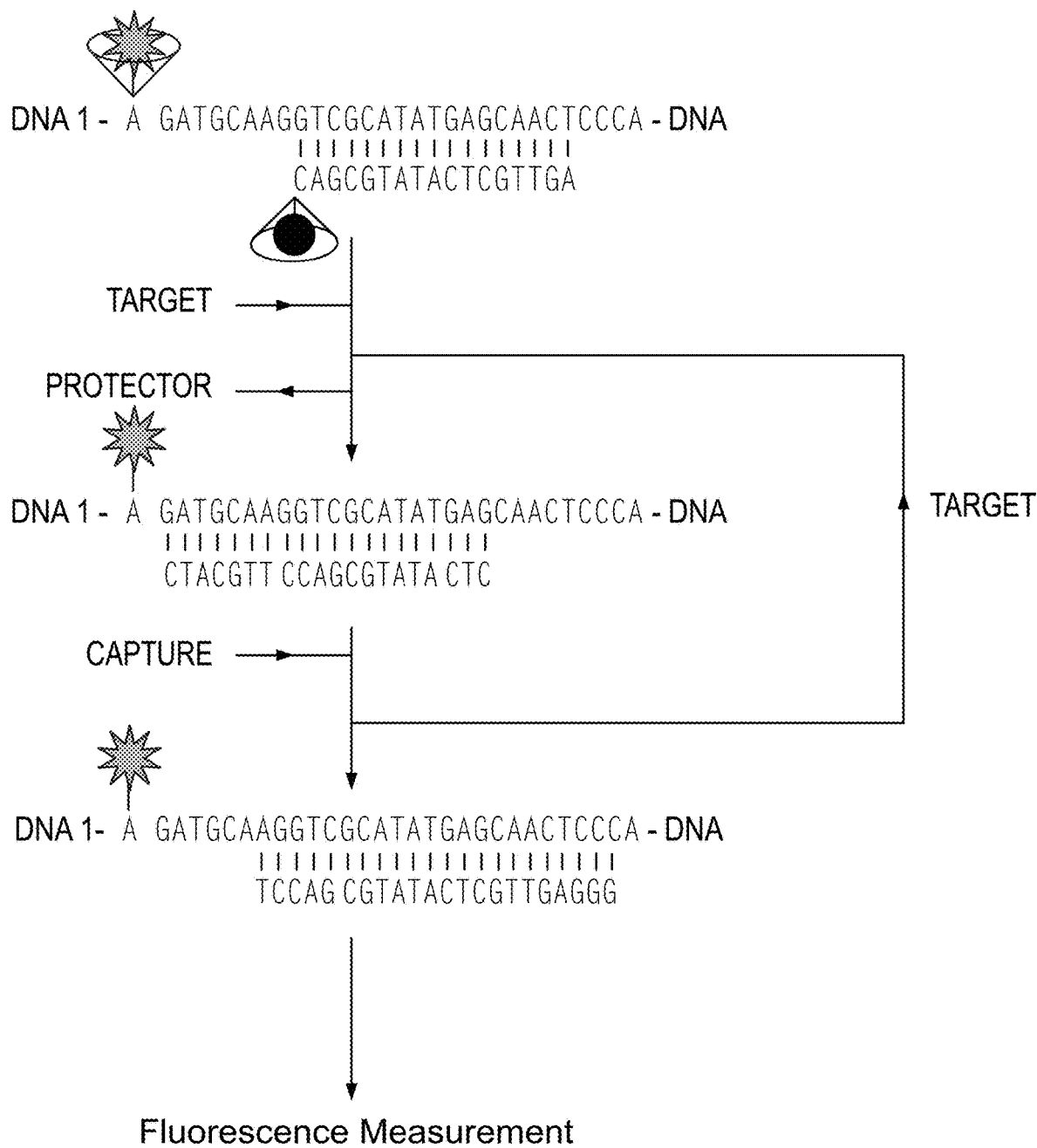
FIG. 2. The concept of duo-TMDR on the one side of the DNA tetrahedron (SEQ ID NOs. 12, 5, 12, 13, 12, and 8, respectively, in order of appearance).

Toehold-mediated displacement reaction (TMDR) is a kinetic-controlled non-enzymatic process. In this process, a single stranded oligonucleotide (referred to as a toehold), which neighbors to a double strand helix, mediates a displacement with another single stranded oligonucleotide. This process can occur automatically at room temperature without any other assistance.

As described herein, a novel duo-toehold-mediated strand displacement method in combination with FRET was developed to detect the presence of viral nucleic acid in a sample (e.g., dengue RNA). Specifically, a DNA-nanostructure was developed to amplify the detection signal of a viral nucleic acid. In the first TMDR process, a target nucleic acid anneals to a complementary DNA sequence via a first toehold in the DNA-nanostructure, displaces a protector DNA and recovers the fluorescence from a quenched fluorophore. In the second TMDR process, a capture DNA displaces the target nucleic acid via a second toehold in the DNA-nanostructure. The target nucleic acid can then be recycled in the first TMDR process and form an amplifying loop, thereby enhancing the fluorescence signal. As described in the Example, the limit of this detection method was as low as 10 pM, which was more sensitive by 3 orders of magnitude than traditional non-amplified detecting methods. Using a single molecule detecting technique, the limit of detection could be as low as 0.1 aM, which means only about six copies of target RNA presented in the sample. Accordingly, certain methods and compositions of the invention are provided below.

Illustrative Methods in Accordance with Certain Embodiments

Certain embodiments of the invention provide a method for detecting a viral nucleic acid in a sample, comprising:
a) contacting the sample with a detection agent and a capture oligonucleotide under conditions suitable for strand displacement, wherein the detection agent comprises a protector oligonucleotide hybridized to a DNA-nanostructure;

wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;

wherein the viral nucleic acid is capable of displacing the protector strand and hybridizing to the DNA-nanostructure (i.e., and thereby disrupting the quenching between the quencher and the fluorophore); and wherein the capture oligonucleotide is capable of displacing the viral nucleic acid and hybridizing to the DNA-nanostructure but is not capable of displacing the protector oligonucleotide; and b) measuring the fluorescent emission from the fluorophore, wherein an increase in fluorescent emission indicates the presence of a viral nucleic acid (e.g., as compared to a control, such as the fluorescent emission of the detection agent prior to being contacted with the sample or a sample comprising no viral nucleic acid).

In certain embodiments of the invention, it is desirable to assay the sample in parallel with a control sample, which comprises a predetermined amount of the viral nucleic acid.

Accordingly, certain embodiments of the invention provide a method for detecting a viral nucleic acid in a test sample, comprising:

a) contacting the test sample with a first detection agent and a first capture oligonucleotide under conditions suitable for strand displacement;

b) contacting a control sample comprising a predetermined amount of viral nucleic acid with a second detection agent and a second capture oligonucleotide under conditions suitable for strand displacement;

wherein each detection agent comprises a protector oligonucleotide hybridized to a DNA-nanostructure;

wherein each DNA-nanostructure is operably linked to a fluorophore and each protector oligonucleotide is operably linked to a quencher or each DNA-nanostructure is operably linked to a quencher and each protector oligonucleotide is operably linked to a fluorophore; and wherein the quencher is capable of quenching the fluorescent light emitted from the fluorophore;

wherein the viral nucleic acid is capable of displacing the protector oligonucleotide and hybridizing to the DNA-nanostructure; and wherein the capture oligonucleotide is capable of displacing the viral nucleic acid and hybridizing to the DNA-nanostructure but is not capable of displacing the protector oligonucleotide; and c) measuring the fluorescent emission from the fluorophore in the test sample and in the control sample, wherein the relative fluorescence in the test sample as compared to the control sample indicates the presence or absence of the viral nucleic acid. In certain embodiments, the control sample is a negative control, and therefore, the predetermined amount of viral nucleic acid in the control sample is no viral nucleic acid. In such an embodiment, a fluorescent emission in the test sample that is greater than the fluorescent emission in the control sample indicates that the test sample comprises viral nucleic acid.

In certain embodiments, the fluorescent emission from the fluorophore in the test sample is at least about 1-100% greater than the fluorescent emission in the control sample (i.e., a negative control sample).

Methods of the invention may also be used to diagnose a mammal with a viral infection. Thus, certain embodiments of the invention provide, a method for diagnosing a mammal with a viral infection comprising:

a) detecting the presence of a viral nucleic acid in a sample obtained from the mammal by:

1) contacting the sample with a detection agent and a capture oligonucleotide under conditions suitable for strand displacement, wherein the detection agent comprises a protector oligonucleotide hybridized to a DNA-nanostructure;

wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;

wherein the viral nucleic acid is capable of displacing the protector oligonucleotide and hybridizing to the DNA-nanostructure; and wherein the capture oligonucleotide is capable of displacing the viral nucleic acid and hybridizing to the DNA-nanostructure but is not capable of displacing the protector oligonucleotide; and 2) measuring the fluorescent emission from the fluorophore, wherein an increase in fluorescent emission as compared to a control indicates the presence of a viral nucleic acid; and b) diagnosing the mammal with a viral infection when the presence of the viral nucleic acid is detected.

In certain embodiments, the methods of the invention further comprise administering a therapeutic agent to the diagnosed mammal. As used herein, the term "therapeutic agent" includes agents that provide a therapeutically desirable effect when administered to an animal (e.g., a mammal, such as a human). The agent may be of natural or synthetic origin. For example, it may be a nucleic acid, a polypeptide, a protein, a peptide, or an organic compound, such as a small molecule. The term "small molecule" includes organic molecules having a molecular weight of less than about, e.g., 1000 amu. In one embodiment a small molecule can have a molecular weight of less than about 800 amu. In another embodiment a small molecule can have a molecular weight of less than about 500 amu.

In certain embodiments, the therapeutic agent is an anti-viral agent. In certain embodiments, the viral nucleic acid is from dengue virus, Ebola virus, human immunodeficiency virus (HIV), hepatitis B, hepatitis C, Influenza, SARS, measles, Zika, yellow fever, West Nile fever, smallpox, Marburg viruses, human papillomavirus, Kaposi's sarcoma-associated herpesvirus or human T-lymphotropic virus and the anti-viral agent is useful for treating the particular virus. In certain embodiments, the viral infection is caused by a dengue virus and the anti-viral agent is useful for treating dengue virus.

In certain embodiments, the sample is contacted with a composition comprising two or more detection agents (e.g., a plurality of detection agents) and two or more capture oligonucleotides (e.g., a plurality of capture oligonucleotides). In such an embodiment, a single viral nucleic acid may sequentially hybridize to a series of DNA-nanostructures and displace the protector oligonucleotides hybridized thereto. This recycling of the viral nucleic acid amplifies fluorescent emission and generates a stronger signal for detection.

In certain embodiments, a method of the invention further comprises incubating the sample, the detection agent and the capture oligonucleotide for a time sufficient for 1) any viral nucleic acid in the sample to hybridize to the DNA-nanostructure and to displace the protector oligonucleotide; 2) the capture reagent to hybridize to the DNA-nanostructure and to displace the viral nucleic acid; and 3) optionally, to repeat steps 1-2 one or more times, so that the displaced viral nucleic acid may hybridize to an additional DNA-nanostructure and displace an additional protector oligonucleotide. For example, in certain embodiments, the sample, the detection agent and the capture oligonucleotide are incubated for about 5, 10, 15, 20, 25, 30, 35, 40, 45, 50, 55 or 60 min. In certain embodiments, the sample, the detection agent and the capture oligonucleotide are incubated for about 1, 2, 3, 4, 5, 6, 7, 8, 9, 10, 11, 12, 13, 14, 15, 16, 17, 18, 19, 20, 21, 22, 23, 24 or more hours. In certain embodiments, the sample, the detection agent and the capture oligonucleotide are incubated for about 3 hours. In certain embodiments, the sample, the detection agent and the capture oligonucleotide are incubated under a set of conditions described herein.

In certain embodiments, the sample, the detection agent and the capture oligonucleotide are contacted in the presence of a buffer solution (e.g., Tris-HCl—$Mg^{2+}$ buffer). As described herein, a "buffer solution" refers to an aqueous solution consisting of a mixture of a weak acid and its conjugate base, or vice versa, and its pH changes very little when a small amount of strong acid or base is added to it. Buffer solutions and buffering agents are known in the art.

In certain embodiments, the sample, the detection agent and the capture oligonucleotide are contacted at a pH 8.0.

In certain embodiments, the sample, the detection agent and the capture oligonucleotide are contacted at room temperature.

In certain embodiments, the sample, the detection agent and the capture oligonucleotide are contacted in the dark.

In certain embodiments, methods of the invention further comprise generating the detection agent, comprising contacting the DNA-nanostructure with the protector oligonucleotide under conditions suitable for hybridization to occur between the protector oligonucleotide and the DNA-nanostructure.

In certain embodiments, the methods further comprise obtaining a test sample (e.g., a biological sample) from a subject (e.g., a mammal, e.g., a human).

In certain embodiments, the methods further comprise exciting the fluorophore.

In certain embodiments, the methods further comprise quantifying the concentration of the viral nucleic acid in the sample.

Viral Nucleic Acid

As described herein, methods of the invention may be used to detect the presence of a viral nucleic acid in a sample. The viral nucleic acid to be detected should be capable of binding to the DNA-nanostructure and displacing the protector oligonucleotide, and as such, should be complementary to a portion of the DNA-nanostructure (e.g., a single stranded portion of the nanostructure). In certain embodiments, the viral nucleic acid comprises a sequence that has at least about 80, 81, 82, 83, 84, 85, 86, 87, 88, 89, 90, 91, 92, 93, 94, 95, 96, 97, 98, 99 or 100% complementarity with a portion of a single stranded region of the DNA-nanostructure (i.e., the first toehold and the region of the DNA-nanostructure to which the protector strand is hybridized). However, the viral nucleic acid should not hybridize with the second toehold domain.

In certain embodiments, the viral nucleic acid is DNA.

In certain embodiments, the viral nucleic acid is RNA.

In certain embodiments, the viral nucleic acid is from dengue virus, Ebola virus, human immunodeficiency virus (HIV), hepatitis B, hepatitis C, Influenza, SARS, measles, Zika, yellow fever, West Nile fever, smallpox, Marburg viruses, human papillomavirus, Kaposi's sarcoma-associated herpesvirus and human T-lymphotropic virus.

In certain embodiments, the viral nucleic acid is from dengue virus. In certain embodiments, the viral nucleic acid is dengue RNA.

Detection Agent

As described herein, the detection agent comprises i) a DNA-nanostructure; and ii) a protector oligonucleotide; wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore.

DNA-Nanostructure

DNA-nanostructures are nanoscale structures made of DNA, wherein the DNA acts both as a structural and function element. DNA-nanostructures can serve as a scaffold for the formation of other structures. DNA-nanostructures may be prepared by methods known in the art using nucleic acid oligonucleotides. For example, such nanostructures may be assembled based on the concept of base-pairing, and while no specific sequence is required, the sequences of each oligonucleotide must be partially complementary to certain other oligonucleotides to enable hybridization of all strands.

The length of each oligonucleotide or DNA strand is variable and depends on, for example, the type of nanostructure. In certain embodiments, the oligonucleotide or DNA strand is about 15 nucleotides in length to about 3000 nucleotides in length, about 15 to about 1500 nucleotides in length, about 15 to about 1000 nucleotides in length, about 15 to about 500 nucleotides in length, about 15 to about 250 nucleotides in length, about 15 to about 100 nucleotides in length, about 15 to about 80 nucleotides in length, or about 30 to about 80 nucleotides in length.

For use in the present invention, the nucleic acids can be synthesized de novo using any of a number of procedures well known in the art. For example, the cyanoethyl phosphoramidite method (Beaucage, S. L., and Caruthers, M. H., Tet. Let. 22:1859, 1981); nucleoside H-phosphonate method (Garegg et al., Tet. Let. 27:4051-4054, 1986; Froehler et al., Nucl. Acid. Res. 14:5399-5407, 1986; Garegg et al., Tet. Let. 27:4055-4058, 1986, Gaffney et al., Tet. Let. 29:2619-2622, 1988). These chemistries can be performed by a variety of automated oligonucleotide synthesizers available in the market.

As described herein, the methods of the invention incorporate the use of TMDR, and as such, the nanostructure should comprise at least one single stranded region, comprising two toehold domains. Portions of this single stranded region should also be complementary to the protector oligonucleotide, the viral nucleic acid and the capture oligonucleotide.

In certain embodiments, the first toehold domain may be used by the viral nucleic acid to displace the protector oligonucleotide and the second toehold domain may be used by the capture oligonucleotide to displace the viral nucleic acid. The toehold domain should comprise a nucleic acid sequence that is complementary to a region of the displacing strand (e.g., the viral nucleic acid or the capture oligonucleotide) and should be located adjacent to a double stranded region comprising the strand to be displaced (e.g., the protector strand bound to the DNA-nanostructure or the viral nucleic acid bound to the DNA-nanostructure). The toehold domain should be long enough to enable sufficient hybridization for strand displacement to occur. While the toehold domain may be longer or shorter, such a domain typically includes between about 4 to about 15 nucleotides, or about 5 to about 8 nucleotides.

Accordingly, in certain embodiments, the DNA-nanostructure comprises a single stranded nucleic acid sequence that comprises a first toehold domain, a hybridization region and a second toehold domain. In certain embodiments, the first toehold domain comprises a nucleic acid sequence that is complementary to a portion of the viral nucleic acid. In certain embodiments, the hybridization region comprises a nucleic acid sequence that is complementary to a portion of the viral nucleic acid, the protector oligonucleotide and the capture oligonucleotide. In certain embodiments, the second toehold domain comprises a nucleic acid sequence that is complementary to a portion of the protector oligonucleotide and a portion of the capture oligonucleotide. In certain embodiments, the viral nucleic acid does not hybridize to the second toehold domain. In certain embodiments, the protector oligonucleotide does not hybridize to the first toehold domain. In certain embodiments, the first toehold domain is linked to the 5'end of the hybridization region and the second toehold domain is linked to the 3'end of the hybridization region (e.g., linked through a phosphodiester bond). In certain embodiments, the first toehold domain is linked to the 3'end of the hybridization region and the second toehold domain is linked to the 5'end of the hybridization region (e.g., linked through a phosphodiester bond).

In certain embodiments, the DNA-nanostructure comprises a single stranded nucleic acid sequence of formula I:

A-B—C (I)

wherein:
A is a first toehold domain;
B is a hybridization region; and
C is a second toehold domain;
wherein, the hybridization region and the second toehold domain comprise nucleic acid sequences that are complementary to the protector oligonucleotide and the capture oligonucleotide; and wherein the first toehold domain and hybridization region comprise sequences that are complementary to the viral nucleic acid.

As described herein, the DNA-nanostructure is operably linked to a fluorophore/quencher. The fluorophore/quencher should be operably linked in proximity to the single stranded region of the DNA-nanostructure, such that quenching may occur between fluorophore/quencher linked to the DNA-nanostructure and the fluorophore/quencher operably linked to the protector oligonucleotide. The linkage between the DNA-nanostructure and the fluorophore/quencher is not critical, and may be any group that can connect the DNA-nanostructure and the fluorophore/quencher using known chemistry, provided that is does not interfere with the quenching or with the strand displacement. Certain embodiments of various fluorophores and quenchers are discussed below.

In certain embodiments, the quencher and fluorophore are separated by between about 1 to about 60 base pairs, about 1 to about 50 base pairs, about 1 to about 40 base pairs, about 1 to about 30 base pairs, about 1 to about 20 base pairs, about 1 to about 15 base pairs or about 1 to about 10 base pairs. In certain embodiments, the quencher and fluorophore are separated by between about 9, 8, 7, 6, 5, 4, 3, 2 or about 1 base pair(s).

In certain embodiments, a fluorophore is operably linked to the DNA-nanostructure and a quencher is operably linked to the protector oligonucleotide.

In certain embodiments, a quencher is operably linked to the DNA-nanostructure and a fluorophore is operably linked to the protector oligonucleotide.

In certain embodiments, the DNA-nanostructure is a DNA-tetrahedron. In certain embodiments, the DNA-tetrahedrons may be prepared by methods described in Zhang, et al., *Chem Commun*, 46, 6792-6794 (2010) and He et al., *Nature*, 2008, 452, 198, which are herein incorporated by reference.

In certain embodiments, the DNA-tetrahedron comprises five double-stranded edges (e.g., 20 bps) and 1 single stranded edges (e.g., 28 bps).

In certain embodiments, the fluorophore/quencher is operably linked at the vertex of the tetrahedron proximal to the single stranded edge.

In certain embodiments, the DNA-tetrahedron is comprised of four DNA oligonucleotides.

In certain embodiments, the DNA-tetrahedron comprises four DNA oligonucleotides, wherein three of the oligonucleotides comprise at least about 75% sequence identity to SEQ ID NO:2, SEQ ID NO:3 and SEQ ID NO:4 and the fourth oligonucleotide comprises a nucleic acid sequence that is complementary to the viral nucleic acid to be detected. In certain embodiments, the fourth oligonucleotide comprises two nucleic acid sequences that can function as toehold domains. In certain embodiments, the fourth oligonucleotide comprises a nucleic acid sequence of formula I. In certain embodiments, the three DNA oligonucleotides comprise nucleic acid sequences independently having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:2, SEQ ID NO:3 and SEQ ID NO:4. In certain embodiments, the three DNA oligonucleotides consist of a nucleic acid sequence independently having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:2, SEQ ID NO:3 and SEQ ID NO:4. In certain embodiments, the fluorophore/quencher is operably linked to SEQ ID NO:4. In certain embodiments, the fluorophore/quencher is operably linked to the 5' end of SEQ ID NO:4. In certain embodiments, the fluorophore/quencher is operably linked to the 3' end of SEQ ID NO:4. In certain embodiments, a fluorophore (e.g., TET) is operably linked to the 5'end of SEQ ID NO:4.

In certain embodiments, the DNA-tetrahedron is used to detect a target nucleic acid (e.g., RNA) and comprises four DNA oligonucleotides comprising at least about 75% sequence identity to SEQ ID NO:1, SEQ ID NO:2, SEQ ID NO:3 and SEQ ID NO:4. In certain embodiments, the four DNA oligonucleotides comprise nucleic acid sequences independently having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:1, SEQ ID NO:2, SEQ ID NO:3 and SEQ ID NO:4. In certain embodiments, the four DNA oligonucleotides consist of a nucleic acid sequence independently having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:1, SEQ ID NO:2, SEQ ID NO:3 and SEQ ID NO:4. In certain embodiments, the fluorophore/quencher is operably linked to SEQ ID NO:4. In certain embodiments, the fluorophore/quencher is operably linked to the 5' end of SEQ ID NO:4. In certain embodiments, the fluorophore/quencher is operably linked to the 3' end of SEQ ID NO:4. In certain embodiments, a fluorophore (e.g., TET) is operably linked to the 5'end of SEQ ID NO:4.

Protector Oligonucleotide

As described herein, the protector oligonucleotide is operably linked to a quencher (DNA-nanostructure operably linked to a fluorophore) or a fluorophore (DNA-nanostructure operably linked to a quencher) and is capable of hybridizing to a single stranded region of the DNA-nanostructure, in a position that is suitable for quenching to occur between the fluorophore and the quencher.

The linkage between the protector oligonucleotide and the fluorophore/quencher is not critical, and may be any group that can connect the protector oligonucleotide and the fluorophore/quencher using known chemistry, provided that is does not interfere with quenching or with the strand displacement. Certain embodiments of various fluorophores and quenchers are discussed below.

In certain embodiments, a fluorophore is operably linked to the DNA-nanostructure and a quencher is operably linked to the protector oligonucleotide.

In certain embodiments, a quencher is operably linked to the DNA-nanostructure and a fluorophore is operably linked to the protector oligonucleotide.

In certain embodiments, the fluorophore/quencher is operably linked to the 3'-end of the protector oligonucleotide. In certain embodiments, the fluorophore/quencher is operably linked to the 5'-end of the protector oligonucleotide.

The protector oligonucleotide should be capable of being displaced by the viral nucleic acid and should not be capable of being displaced by the capture oligonucleotide. Accordingly, in certain embodiments, the protector oligonucleotide is complementary to a single stranded region of the DNA-nanostructure and hybridizes to the second toehold but not the first toehold. In certain embodiments, the protector oligonucleotide comprises a sequence that has at least about 80, 81, 82, 83, 84, 85, 86, 87, 88, 89, 90, 91, 92, 93, 94, 95, 96, 97, 98, 99 or 100% complementarity with a portion of the single stranded region of the DNA-nanostructure (i.e., the second toehold and an adjacent hybridization region).

In certain embodiments, the protector oligonucleotide is hybridized to a single-stranded region of the DNA-nanostructure, wherein the region of hybridization is linked to a toehold domain, and wherein the toehold domain is complementary to the viral nucleic acid. In certain embodiments, the region of hybridization includes a second toehold domain, and wherein the second toehold domain is complementary to the capture oligonucleotide.

The length of the protector oligonucleotide will depend on a variety of factors, including the size of the DNA-nanostructure and the sequence of the viral nucleic acid to be detected. In certain embodiments, the protector oligonucleotide is between about 10 to about 50 nucleotides in length. In certain embodiments, the protector oligonucleotide is between about 10 to about 40 nucleotides in length. In certain embodiments, the protector oligonucleotide is between about 10 to about 30 nucleotides in length. In certain embodiments, the protector oligonucleotide is between about 10 to about 25 nucleotides in length. In certain embodiments, the protector oligonucleotide is between about 15 to about 25 nucleotides in length. In certain embodiments, the protector oligonucleotide is between about 17 nucleotides in length. In certain embodiments, the protector oligonucleotide is between about 18 nucleotides in length. In certain embodiments, the protector oligonucleotide is between about 19 nucleotides in length.

In certain embodiments, a method of the invention is used to detect a target nucleic acid. In certain embodiments, the protector oligonucleotide comprises a nucleic acid sequence having at least about 75% sequence identity to SEQ ID NO:5, SEQ ID NO:6 or SEQ ID NO:7. In certain embodiments, the protector oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:5. In certain embodiments, the protector oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:5. In certain embodiments, the protector oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:6. In certain embodiments, the protector oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:6. In certain embodiments, the protector oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:7. In certain embodiments, the protector oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:7.

In certain embodiments, a quencher is operably linked to the 3' end of the protector oligonucleotide (e.g., comprising SEQ ID NO:5, SEQ ID NO:6 or SEQ ID NO:7).

Fluorophore & Quencher

As described herein, the DNA-nanostructure is operably linked to a fluorophore and the protector oligonucleotide is operably linked to a quencher or the DNA-nanostructure is operably linked to a quencher and the protector oligonucleotide is operably linked to a fluorophore; and the quencher is capable of quenching the fluorescent light emitted from the fluorophore.

Chemical moieties that quench fluorescent light operate through a variety of mechanisms, including fluorescence resonance energy transfer (FRET) processes and ground state quenching. FRET is one of the most common mechanisms of fluorescent quenching and can occur when the emission spectrum of the fluorescent donor overlaps the absorbance spectrum of the quencher and when the donor and quencher are within a sufficient distance known as the Forster distance. The energy absorbed by a quencher can subsequently be released through a variety of mechanisms depending upon the chemical nature of the quencher. Captured energy can be released through fluorescence or through non-fluorescent mechanisms, including charge transfer and collisional mechanisms, or a combination of such mechanisms. When a quencher releases captured energy through non-fluorescent mechanisms FRET is simply observed as a reduction in the fluorescent emission of the fluorescent donor. Although FRET is the most common mechanism for quenching, any combination of molecular orientation and spectral coincidence that results in quenching is a useful mechanism for quenching. For example, ground-state quenching can occur in the absence of spectral overlap if the fluorophore and quencher are sufficiently close together to form a ground state complex.

Accordingly, the term "quenching" as used herein refers to the process wherein the quencher molecule absorbs energy from an excited fluorophore and then releases the captured energy through either fluorescent or non-fluorescent mechanisms. As used herein, the term "quencher" includes both molecules that do not emit any fluorescence signal ("dark quenchers"), as well as molecules that are themselves fluorophores and emit a signal ("fluorescent quenchers").

As discussed above, for quenching to occur, the fluorophore and quencher must be in physical proximity. When the fluorophore and quencher are separated (i.e., when the protector oligonucleotide is not hybridized to the DNA-nanostructure), energy absorbed by the fluorophore is no longer transferred to the quencher and is instead emitted as light at the wavelength characteristic of the fluorophore. Appearance/increase of a fluorescent signal from the fluorophore following removal of quenching is a detectable event and constitutes a "positive signal" in the assay of the present invention, and indicates the presence of a viral nucleic acid in a sample.

Specifically, detection agents that employ a fluorescent quencher will emit light both when the protector oligonucleotide is hybridized and unhybridized to the DNA-nanostructure; however, the wavelength of the light will differ depending on the hybridization state. In the hybridized state, energy captured by the fluorophore is transferred to the fluorescent quencher via FRET and is emitted as light at a wavelength characteristic of the fluorescent quencher. In the unhybridized state, the fluorophore and quencher are separated and energy absorbed by the fluorophore is no longer transferred to the quencher and is instead emitted as light at a wavelength characteristic of the fluorophore. In contrast, when the detection agent employs a dark quencher, a variation in the amount of fluorescent emission from the fluorophore will be observed depending on the hybridization state. In particular, when protector oligonucleotide is not hybridized to the DNA-nanostructure, energy absorbed by the fluorophore is emitted as light at a wavelength characteristic of the fluorophore. However, when the protector oligonucleotide is hybridized, energy captured by the dark quencher is released by non-fluorescent mechanisms, which appears as a reduction in the fluorescent emission from the fluorophore.

As discussed herein, quenching processes that rely on the interaction of two dyes as their spatial relationship changes can be used conveniently to detect the presence of a viral nucleic acids using a method described herein. As noted previously, the energy transfer process requires overlap between the emission spectrum of the fluorescent donor and the absorbance spectrum of the quencher. Therefore, quencher/fluorophore pairs may be selected by one skilled in the art based on their emission and absorbance spectrums to ensure sufficient quenching. For example, the quencher BHQ-1, which maximally absorbs light in the wavelength range of about 500-550 nm, can quench the fluorescent light emitted from the fluorophore fluorescein, which has a wavelength of about 520 nm. In contrast, the quencher BHQ-3, which maximally absorbs light in the wavelength range of about 650-700 nm would be less effective at quenching the fluorescence of fluorescein but would be quite effective at quenching the fluorescence of the fluorophore Cy5 which fluoresces at about 670 nm.

A fluorophore is a molecule that absorbs light (i.e., excites) at a characteristic wavelength and emits light (i.e., fluoresces) at a second lower-energy wavelength. Fluorescence reporter groups that can be operably linked to the DNA-nanostructure/protector oligonucleotide include, but are not limited to, fluorescein, tetrachlorofluorescein (TET), hexachlorofluorescein, tetramethylrhodamine, rhodamine, cyanine-derivative dyes, Texas Red, Bodipy, and Alexa dyes.

In certain embodiments, the fluorophore is TET. Characteristic absorption and emission wavelengths for each of these are well known to those of skill in the art.

In certain embodiments, the fluorophore is selected from the fluorophores listed in Table A below.

Additionally, as discussed above, a fluorophore may also be a fluorescent quencher, provided its absorbance spectrum overlaps with emission spectrum of the selected fluorophore donor (i.e., the fluorophore and fluorescent quencher are a FRET donor/acceptor pair).

Accordingly, in certain embodiments, the quencher is a fluorescent quencher. In certain embodiments, the fluorescent quencher is selected from the fluorophores listed in Table A.

TABLE A

| Probe | Excitation (nm) | Emission (nm) |
|---|---|---|
| Hydroxycoumarin | 325 | 386 |
| Alexa fluor | 325 | 442 |
| Aminocoumarin | 350 | 445 |
| Methoxycoumarin | 360 | 410 |
| Cascade Blue | (375); 401 | 423 |
| Pacific Blue | 403 | 455 |
| Pacific Orange | 403 | 551 |
| Lucifer yellow | 425 | 528 |
| Alexa fluor 430 | 430 | 545 |
| NBD | 466 | 539 |
| R-Phycoerythrin (PE) | 480; 565 | 578 |
| PE-Cy5 conjugates | 480; 565; 650 | 670 |
| PE-Cy7 conjugates | 480; 565; 743 | 767 |
| Red 613 | 480; 565 | 613 |
| PerCP | 490 | 675 |
| Cy2 | 490 | 510 |
| TruRed | 490, 675 | 695 |
| FluorX | 494 | 520 |
| Fluorescein | 495 | 519 |
| FAM | 495 | 515 |
| BODIPY-FL | 503 | 512 |
| TET | 526 | 540 |
| Alexa fluor 532 | 530 | 555 |
| HEX | 535 | 555 |
| TRITC | 547 | 572 |
| Cy3 | 550 | 570 |
| TMR | 555 | 575 |
| Alexa fluor 546 | 556 | 573 |
| Alexa fluor 555 | 556 | 573 |
| Tamara | 565 | 580 |
| X-Rhodamine | 570 | 576 |
| Lissamine Rhodamine B | 570 | 590 |
| ROX | 575 | 605 |
| Alexa fluor 568 | 578 | 603 |
| Cy3.5 581 | 581 | 596 |
| Texas Red | 589 | 615 |
| Alexa fluor 594 | 590 | 617 |
| Alexa fluor 633 | 621 | 639 |
| LC red 640 | 625 | 640 |
| Allophycocyanin (APC) | 650 | 660 |
| Alexa fluor 633 | 650 | 688 |
| APC-Cy7 conjugates | 650; 755 | 767 |
| Cy5 | 650 | 670 |
| Alexa fluor 660 | 663 | 690 |
| Cy5.5 | 675 | 694 |
| LC red 705 | 680 | 710 |
| Alexa fluor 680 | 679 | 702 |
| Cy7 | 743 | 770 |
| IRDye 800 CW | 774 | 789 |

Thus, in certain embodiments, the fluorophore is selected from the group consisting of fluorescein, tetrachlorofluorescein (TET), hexachlorofluorescein, tetramethylrhodamine, rhodamine, cyanine-derivative dyes, Texas Red, Bodipy, Alexa dyes and the fluorophores listed in Table A.

In certain in vivo embodiments, the fluorophore emits in the near infrared range, such as in the 650-900 nm range.

(Weissleder et al., "Shedding light onto live molecular targets, *Nature Medicine,* 9:123-128 (2003)).

In one embodiment of the invention, the quencher does not itself emit a fluorescence signal, i.e. is a "dark quencher". "Dark quenchers" useful in compositions of the invention include, but are not limited to, dabcyl, QSY™-7, QSY-33 (4',5-dinitrofluorescein, pipecolic acid amide) and Black-Hole Quenchers™1, 2, and 3 (Biosearch Technologies, Novato, Calif.). In certain embodiments, the quencher is BHQ-1.

In certain embodiments, the quencher is one or more of the quenchers listed in Table B.

TABLE B

| Quencher | Absorption Maximum (nm) |
| --- | --- |
| DDQ-I | 430 |
| Dabcyl | 475 |
| Eclipse | 530 |
| Iowa Black FQ | 532 |
| BHQ-1 | 534 |
| QSY-7 | 571 |
| BHQ-2 | 580 |
| DDQ-II | 630 |
| Iowa Black RQ | 645 |
| QSY-21 | 660 |
| BHQ-3 | 670 |
| IRDye QC-1 | 737 |

Thus, in certain embodiments, the quencher is selected from dabcyl, QSY™-7, QSY-33 (4',5-dinitrofluorescein, pipecolic acid amide) Black-Hole Quenchers (BHQ-) -1, -2, and -3 and the quenchers listed in Table B.

Additional quenchers are described in U.S. Pat. No. 7,439,341, which is incorporated by reference herein.

In certain embodiments, the fluorophore is TET and the quencher is BHQ-1.

When compositions that employ fluorescent quenchers are used in a FRET assay, detection may be done using a fluorometer, fluorescence spectrometer or time-correlated single photon counting (TCSPC). In certain embodiments, detection agents that employ a "dark quencher" will emit light only when the protector group is not hybridized to DNA-nanostructure, thereby enabling signal detection to be performed visually (detection may also be done using a fluorometer, fluorescence spectrometer or TCSPC). Visual detection is rapid, convenient, and does not require the availability of any specialized equipment. Thus, as used herein, the term "measuring" also includes visual detection and comparison (e.g., as compared to a negative control or as compared to the fluorescence of the detection agent prior to contact with the sample). Accordingly, it may be possible to detect the presence of the viral nucleic acid with unassisted visual inspection of the sample after being contacted with the detection agent and capture oligonucleotide. However, the fluorescent emission in the test and control samples may also be measured spectrophotometrically using a spectrophotometer, fluorometrically using a fluorometer or using TCSPC to measure the intensity, or by using any other devices capable of detecting absorbance/fluorescent light emission in a quantitative or qualitative fashion.

Linkers

As described herein, the fluorophore/quencher is operably linked to the DNA-nanostructure/protector oligonucleotide. In certain embodiments, the fluorophore and/or quencher is operably linked to the DNA-nanostructure/protector oligonucleotide by means of a linker.

Chemistries that can be used to link the fluorophores and quencher to an oligonucleotide are known in the art, such as disulfide linkages, amino linkages, covalent linkages, etc. In certain embodiments, aliphatic or ethylene glycol linkers that are well known to those with skill in the art can be used. In certain embodiments phosphodiester, phosphorothioate and/or other modified linkages are used.

In certain embodiments, the linker is a binding pair. In certain embodiments, the "binding pair" refers to two molecules which interact with each other through any of a variety of molecular forces including, for example, ionic, covalent, hydrophobic, van der Waals, and hydrogen bonding, so that the pair have the property of binding specifically to each other. Specific binding means that the binding pair members exhibit binding to each other under conditions where they do not bind to another molecule. Examples of binding pairs are biotin-avidin, hormone-receptor, receptor-ligand, enzyme-substrate probe, IgG-protein A, antigen-antibody, and the like. In certain embodiments, a first member of the binding pair comprises avidin or streptavidin and a second member of the binding pair comprises biotin.

Capture Oligonucleotide

As described herein, the capture oligonucleotide should be capable of displacing the viral nucleic acid and hybridizing to the DNA-nanostructure but should not be capable of displacing the protector oligonucleotide. Accordingly, in certain embodiments, the capture oligonucleotide is complementary to a single stranded region of the DNA-nanostructure and is capable of hybridizing to the second toehold (i.e., the viral nucleic acid is bound and the second toehold domain is accessible). In certain embodiments, the capture oligonucleotide comprises a sequence that has at least about 80, 81, 82, 83, 84, 85, 86, 87, 88, 89, 90, 91, 92, 93, 94, 95, 96, 97, 98, 99 or 100% complementarity with a portion of the single stranded region of the DNA-nanostructure (i.e., the second toehold and the adjacent region wherein the viral nucleic acid is capable of hybridizing).

In certain embodiments, the capture oligonucleotide comprises a nucleic acid sequence that is complementary to a toehold domain in the DNA-nanostructure, wherein the toehold domain is linked to a nucleic acid sequence in the DNA-nanostructure that is capable of hybridizing to the viral nucleic acid.

The length of the capture oligonucleotide will depend on a variety of factors, including the size of the DNA-nanostructure and the sequence of the viral nucleic acid to be detected. In certain embodiments, the capture oligonucleotide is between about 10 to about 50 nucleotides in length. In certain embodiments, the capture oligonucleotide is between about 10 to about 40 nucleotides in length. In certain embodiments, the capture oligonucleotide is between about 10 to about 30 nucleotides in length. In certain embodiments, the capture oligonucleotide is between about 15 to about 30 nucleotides in length. In certain embodiments, the capture oligonucleotide is between about 20 to about 27 nucleotides in length. In certain embodiments, the capture oligonucleotide is about 23 nucleotides in length. In certain embodiments, the capture oligonucleotide is about 24 nucleotides in length. In certain embodiments, the capture oligonucleotide is about 25 nucleotides in length.

In certain embodiments, a method of the invention is used to detect a target nucleic acid. In certain embodiments, the capture oligonucleotide comprises a nucleic acid sequence having at least about 75% sequence identity to SEQ ID NO:8, SEQ ID NO:9 or SEQ ID NO:10. In certain embodiments, the capture oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:8. In certain embodiments, the capture oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:8. In certain embodiments, the capture oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:9. In certain embodiments, the capture oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:9. In certain embodiments, the capture oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:10. In certain embodiments, the capture oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:10.

Sample

The methods described herein may be used to detect the presence of viral nucleic acid in a sample, such as a biological fluid (e.g., present in molar, millimolar, micromolar, nanomolar, picomolar, femtomolar, attomolar or sub-attomolar concentrations). Thus, in certain embodiments, the concentration of the viral nucleic acid in the sample is less than about, e.g., 10 mole, 1 mole, 100 millimole, 10 millimole, 1 millimole, 100 micromole, 10 micromole, 1 micromole, 100 nanomole, 10 nanomole, 1 nanomole, 100 picomole, 10 picomole, 1 picomole, 100 femtomole, 10 femtomole, 1 femtomole, 100 attomole, 10 attomole, 1 attomole or 0.1 attomole.

As used herein, a "sample" may be any sample potentially comprising a viral nucleic acid. In certain embodiments, the sample is a liquid sample. In certain embodiments, the sample is a biological sample obtained from a subject, such as a mammal. In certain embodiments, the sample is derived from a biological sample obtained from a subject, such as a mammal. Thus, certain embodiments of the invention, further comprise obtaining a biological sample from a subject. As described herein, the term "biological fluid" refers to any bio-organic fluid produced by an organism and includes, but is not limited to, e.g., amniotic fluid, aqueous humour, vitreous humour, bile, blood or components of blood (e.g., serum or plasma), milk, cerebrospinal fluid (CSF), endolymph, perilymph, feces, lymph, mucus, pericardial fluid, peritoneal fluid, pleural fluid, pus, serous fluid, semen, sputum, synovial fluid, sweat, urine, saliva, tears, vaginal secretions and vomit. In certain embodiments, the biological fluid is blood or a blood component, such as serum. In certain embodiments, a biological fluid is processed prior to performing an assay described herein. In certain embodiments, a biological fluid is not processed prior to performing an assay described herein.

Illustrative Compositions and Kits in Accordance with Certain Embodiments

Certain embodiments of the invention provide a DNA-nanostructure described herein (e.g., a DNA tetrahedron described herein). In certain embodiments, the DNA-nanostructure is a DNA-tetrahedron that comprises a fluorophore operably linked to one of the oligonucleotides. Certain embodiments of the invention provide a protector oligonucleotide described herein. Certain embodiments of the invention provide a detector agent described herein. Certain embodiments of the invention provide a capture oligonucleotide described herein.

Certain embodiments of the invention provide a composition comprising a detection agent described herein and a capture oligonucleotide described herein, and optionally, a buffer. In certain embodiments, the composition comprises a plurality of each of the components.

Certain embodiments of the invention provide a composition comprising a DNA-nanostructure described herein, a protector oligonucleotide described herein, and/or a capture oligonucleotide described herein. Certain embodiments of the invention provide a composition comprising a DNA-nanostructure described herein, a protector oligonucleotide described herein, and optionally, a capture oligonucleotide described herein. In certain embodiments, the composition further comprises a carrier. In certain embodiments, the composition comprises a plurality of each of the components.

Accordingly, certain embodiments of the invention provide a composition for detecting a viral nucleic acid in a sample, comprising:
 a DNA-nanostructure, a capture oligonucleotide and a protector oligonucleotide;
 wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;
 wherein the protector oligonucleotide is capable of hybridizing to the DNA-nanostructure;
 wherein the viral nucleic acid is capable of displacing the protector oligonucleotide and hybridizing to the DNA-nanostructure; and
 wherein the capture oligonucleotide is capable of displacing the viral nucleic acid and hybridizing to the DNA-nanostructure but is not capable of displacing the protector oligonucleotide.

In certain embodiments, the DNA-nanostructure comprises at least one single stranded region.

In certain embodiments, the single stranded region comprises a nucleic acid sequence that comprises a first toehold domain, a hybridization region and a second toehold domain. In certain embodiments, the first toehold domain comprises a nucleic acid sequence that is complementary to a portion of the viral nucleic acid. In certain embodiments, the protector oligonucleotide is not capable of hybridizing to the first toehold domain. In certain embodiments, the second toehold domain comprises a nucleic acid sequence that is complementary to a portion of the protector oligonucleotide and a portion of the capture oligonucleotide. In certain embodiments, the viral nucleic acid is not capable of hybridizing to the second toehold domain. In certain embodiments, the hybridization region comprises a nucleic acid sequence that is complementary to a portion of the viral nucleic acid, a portion of the protector oligonucleotide and a portion of the capture oligonucleotide.

In certain embodiments, the DNA-nanostructure is a DNA-tetrahedron. In certain embodiments, the DNA-tetrahedron comprises five double-stranded edges and one single stranded edge. In certain embodiments, the fluorophore/ quencher is operably linked at the tetrahedron vertex, proximal to the single stranded edge. In certain embodiments, the DNA-tetrahedron comprises four oligonucleotides having at least about 90% sequence identity to SEQ ID NO:1, SEQ ID NO:2, SEQ ID NO:3 and SEQ ID NO:4.

In certain embodiments, the protector oligonucleotide is between about 15 to about 25 nucleotides in length. In certain embodiments, the fluorophore/quencher is operably linked to the 5' or 3' end of the protector oligonucleotide. In certain embodiments, the protector oligonucleotide comprises a nucleic acid sequence having at least about 90% sequence identity to SEQ ID NO:5, SEQ ID NO:6 or SEQ ID NO:7.

In certain embodiments, the capture oligonucleotide is between about 15 to about 30 nucleotides in length. In certain embodiments, the capture oligonucleotide comprises a nucleic acid sequence that is complementary to a toehold domain in the DNA-nanostructure, and wherein the toehold domain is linked to a nucleic acid sequence in the DNA-nanostructure that is capable of hybridizing to the viral nucleic acid. In certain embodiments, the capture oligonucleotide comprises a nucleic acid sequence having at least about 90% sequence identity to SEQ ID NO:8, SEQ ID NO:9 or SEQ ID NO:10.

In certain embodiments, the viral nucleic acid is from dengue virus, Ebola virus, human immunodeficiency virus (HIV), hepatitis B, hepatitis C, Influenza, SARS, measles, Zika, yellow fever, West Nile fever, smallpox, Marburg viruses, human papillomavirus, Kaposi's sarcoma-associated herpesvirus or human T-lymphotropic virus. In certain embodiments, viral nucleic acid is from Dengue virus.

Certain embodiments of the invention provide a DNA-tetrahedron comprising four DNA oligonucleotides, wherein three of the oligonucleotides comprise at least about 75% sequence identity to SEQ ID NO:2, SEQ ID NO:3 and SEQ ID NO:4 and the fourth oligonucleotide comprises a nucleic acid sequence that is complementary to the viral nucleic acid to be detected. In certain embodiments, the fourth oligonucleotide comprises two nucleic acid sequences that can function as toehold domains. In certain embodiments, the fourth oligonucleotide comprises a nucleic acid sequence of formula I. In certain embodiments, the three DNA oligonucleotides independently comprise at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:2, SEQ ID NO:3 and SEQ ID NO:4. In certain embodiments, the three DNA oligonucleotides consist of a nucleic acid sequences independently having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:2, SEQ ID NO:3 and SEQ ID NO:4. In certain embodiments, the fluorophore/quencher is operably linked to SEQ ID NO:4. In certain embodiments, the fluorophore/quencher is operably linked to the 5' end of SEQ ID NO:4. In certain embodiments, the fluorophore/quencher is operably linked to the 3' end of SEQ ID NO:4. In certain embodiments, a fluorophore (e.g., TET) is operably linked to the 5'end of SEQ ID NO:4.

As described herein, methods of the invention may be used to detect viral nucleic acid in a sample. In certain embodiments, the viral nucleic acid is from dengue virus. The following embodiments describe DNA-nanostructures, protector oligonucleotides and capture oligonucleotides, which may be used to detect a target RNA using methods described herein (e.g., to detect SEQ ID NO:11).

Certain embodiments of the invention provide a DNA-tetrahedron comprising four oligonucleotides, wherein the oligonucleotides comprise a sequence having at least about 75% sequence identity to SEQ ID NO:1, SEQ ID NO:2, SEQ ID NO:3 and SEQ ID NO:4. In certain embodiments, the four DNA oligonucleotides independently comprise at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:1, SEQ ID NO:2, SEQ ID NO:3 and SEQ ID NO:4. In certain embodiments, the four DNA oligonucleotides consist of a nucleic acid sequences independently having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:1, SEQ ID NO:2, SEQ ID NO:3 and SEQ ID NO:4. In certain embodiments, a fluorophore/quencher is operably linked to one of the oligonucleotides (e.g., a fluorophore or quencher described herein). In certain embodiments, a fluorophore/quencher is operably linked to SEQ ID NO:4. In certain embodiments, a fluorophore/quencher is operably linked to the 5' end of SEQ ID NO:4. In certain embodiments, a fluorophore/quencher is operably linked to the 3' end of SEQ ID NO:4. In certain embodiments, a fluorophore (e.g., TET) is operably linked to the 5'end of SEQ ID NO:4.

Certain embodiments of the invention provide a protector oligonucleotide comprising nucleic acid sequence having at least about 75% sequence identity to SEQ ID NO:5, SEQ ID NO:6 or SEQ ID NO:7. In certain embodiments, the protector oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:5. In certain embodiments, the protector oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:5. In certain embodiments, the protector oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:6. In certain embodiments, the protector oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:6. In certain embodiments, the protector oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:7. In certain embodiments, the protector oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:7. In certain embodiments, a fluorophore/quencher is operably linked to the 3'-end of the protector oligonucleotide (e.g., a fluorophore or quencher described herein). In certain embodiments, the fluorophore/quencher is operably linked to the 5'-end of the protector oligonucleotide (e.g., a fluorophore or quencher described herein). In certain embodiments, a quencher is operably linked to the 3' end of the protector oligonucleotide (e.g., comprising SEQ ID NO:5, SEQ ID NO:6 or SEQ ID NO:7). In certain embodiments, the quencher is BHQ-1.

Certain embodiments of the invention provide a capture oligonucleotide comprising a nucleic acid sequence having at least about 75% sequence identity to SEQ ID NO:8, SEQ ID NO:9 or SEQ ID NO:10. In certain embodiments, the capture oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:8. In certain embodiments, the capture oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:8. In certain embodiments, the capture oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:9. In certain embodiments, the capture oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:9. In certain embodiments, the capture oligonucleotide comprises a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:10. In certain embodiments, the capture oligonucleotide consists of a nucleic acid sequence having at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% sequence identity to SEQ ID NO:10.

The present invention further provides kits for practicing the present methods. Accordingly, certain embodiments of the invention provide a kit for detecting viral nucleic acid in a sample comprising:
  a) a DNA-nanostructure;
  b) a protector oligonucleotide;
  b) a capture oligonucleotide; and
  c) instructions for use;
  wherein the DNA-nanostructure is operably linked to a fluorophore and the protector oligonucleotide is operably linked to a quencher or the DNA-nanostructure is operably linked to a quencher and the protector oligonucleotide is operably linked to a fluorophore; and wherein the quencher is capable of quenching the fluorescent light emitted from the fluorophore;
  wherein the protector oligonucleotide is capable of hybridizing to the DNA-nanostructure;
  wherein the viral nucleic acid is capable of displacing the protector oligonucleotide and hybridizing to the DNA-nanostructure; and
  wherein the capture oligonucleotide is capable of displacing the viral nucleic acid and hybridizing to the DNA-nanostructure but is not capable of displacing the protector oligonucleotide.

In certain embodiments, the kit comprises a DNA-nanostructure described herein (e.g., a DNA-tetrahedron described herein). In certain embodiments, the kit comprises a protector oligonucleotide as described herein. In certain embodiments, the kit comprises a capture oligonucleotide as described herein. In certain embodiments, the kit comprises a quencher described herein (e.g., a dark quencher or a fluorescent quencher). Such kits may optionally contain one or more of: a positive and/or negative control, RNase-free water, and one or more buffers. In certain embodiments, a kit may further include RNase-free laboratory plasticware (e.g., a plate(s), such a multi-well plate(s), such as a 96 well plate(s), a petri dish(es), a test tube(s), a cuvette(s), a plate(s) for fluorescence or luminescence etc.).

Administration

As described herein, methods of the invention may further comprise administering a therapeutic agent to a mammal (e.g., a mammal diagnosed with a particular disease, disorder or condition using a method described herein). Such a therapeutic agent may be formulated as pharmaceutical composition and administered to a mammalian host, such as a human patient in a variety of forms adapted to the chosen route of administration, i.e., orally or parenterally, by intravenous, intramuscular, topical or subcutaneous routes.

Thus, the therapeutic agents may be systemically administered, e.g., orally, in combination with a pharmaceutically acceptable vehicle such as an inert diluent or an assimilable edible carrier. They may be enclosed in hard or soft shell gelatin capsules, may be compressed into tablets, or may be incorporated directly with the food of the patient's diet. For oral therapeutic administration, the active compound may be combined with one or more excipients and used in the form of ingestible tablets, buccal tablets, troches, capsules, elixirs, suspensions, syrups, wafers, and the like. Such compositions and preparations should contain at least 0.1% of active compound. The percentage of the compositions and preparations may, of course, be varied and may conveniently be between about 2 to about 60% of the weight of a given unit dosage form. The amount of active compound in such therapeutically useful compositions is such that an effective dosage level will be obtained. The tablets, troches, pills, capsules, and the like may also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the active compound may be incorporated into sustained-release preparations and devices.

The active compound may also be administered intravenously or intraperitoneally by infusion or injection. Solutions of the active compound or its salts can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active ingredient which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms can be brought about by various antibacterial and antifungal agents, for example, parabens, chlorobutanol, phenol, sorbic acid, thimerosal, and the like. In many cases, it will include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with various of the other ingredients enumerated above, as required, followed by filter sterilization. In the case of sterile powders for the preparation of sterile injectable solutions, the specific methods of preparation include vacuum drying and the freeze drying techniques, which yield a powder of the active ingredient plus any additional desired ingredient present in the previously sterile-filtered solutions.

For topical administration, the present compounds may be applied in pure form, i.e., when they are liquids. However, it will generally be desirable to administer them to the skin as compositions or formulations, in combination with a dermatologically acceptable carrier, which may be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the present compounds can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Examples of useful dermatological compositions which can be used to deliver a therapeutic agent to the skin are known to the art; for example, see Jacquet et al. (U.S. Pat. No. 4,608,392), Geria (U.S. Pat. No. 4,992,478), Smith et al. (U.S. Pat. No. 4,559,157) and Wortzman (U.S. Pat. No. 4,820,508).

Useful dosages of therapeutic agents can be determined by comparing their in vitro activity, and in vivo activity in animal models. Methods for the extrapolation of effective dosages in mice, and other animals, to humans are known to the art; for example, see U.S. Pat. No. 4,938,949.

The amount of the therapeutic agent, or an active salt or derivative thereof, required for use in treatment will vary not only with the particular salt selected but also with the route of administration, the nature of the condition being treated and the age and condition of the patient and will be ultimately at the discretion of the attendant physician or clinician.

The therapeutic agent is conveniently formulated in unit dosage form. In one embodiment, the invention provides a composition comprising a therapeutic agent formulated in such a unit dosage form. The desired dose may conveniently be presented in a single dose or as divided doses administered at appropriate intervals, for example, as two, three, four or more sub-doses per day. The sub-dose itself may be further divided, e.g., into a number of discrete loosely spaced administrations; such as multiple inhalations from an insufflator or by application of a plurality of drops into the eye.

Certain Definitions

As used herein, the term "about" means±10%.

"Operably-linked" refers to the association two chemical moieties so that the function of one is affected by the other, e.g., an arrangement of elements wherein the components so described are configured so as to perform their usual function.

The term "nucleic acid" refers to deoxyribonucleotides or ribonucleotides and polymers thereof in either single- or double-stranded form, made of monomers (nucleotides) containing a sugar, phosphate and a base that is either a purine or pyrimidine. Unless specifically limited, the term encompasses nucleic acids containing known analogs of natural nucleotides that have similar binding properties as the reference nucleic acid and are metabolized in a manner similar to naturally occurring nucleotides. Unless otherwise indicated, a particular nucleic acid sequence also encompasses conservatively modified variants thereof (e.g., degenerate codon substitutions) and complementary sequences, as well as the sequence explicitly indicated. Specifically, degenerate codon substitutions may be achieved by generating sequences in which the third position of one or more selected (or all) codons is substituted with mixed-base and/or deoxyinosine residues.

The terms "nucleotide sequence" and "nucleic acid sequence" refer to a sequence of bases (purines and/or pyrimidines) in a polymer of DNA or RNA, which can be single-stranded or double-stranded, optionally containing synthetic, non-natural or altered nucleotide bases capable of incorporation into DNA or RNA polymers, and/or backbone modifications (e.g., a modified oligomer, such as a morpholino oligomer, phosphorodiamate morpholino oligomer or vivo-mopholino). The terms "oligo", "oligonucleotide" and "oligomer" may be used interchangeably and refer to such sequences of purines and/or pyrimidines. The terms "modified oligos", "modified oligonucleotides" or "modified oligomers" may be similarly used interchangeably, and refer to such sequences that contain synthetic, non-natural or altered bases and/or backbone modifications (e.g., chemical modifications to the internucleotide phosphate linkages and/or to the backbone sugar).

Modified nucleotides are known in the art and include, by example and not by way of limitation, alkylated purines and/or pyrimidines; acylated purines and/or pyrimidines; or other heterocycles. These classes of pyrimidines and purines are known in the art and include, pseudoisocytosine; N4, N4-ethanocytosine; 8-hydroxy-N6-methyladenine; 4-acetylcytosine, 5-(carboxyhydroxylmethyl) uracil; 5-fluorouracil; 5-bromouracil; 5-carboxymethylaminomethyl-2-thiouracil; 5-carboxymethylaminomethyl uracil; dihydrouracil; inosine; N6-isopentyl-adenine; 1-methyladenine; 1-methylpseudouracil; 1-methylguanine; 2,2-dimethylguanine; 2-methyladenine; 2-methylguanine; 3-methylcytosine; 5-methylcytosine; N6-methyladenine; 7-methylguanine; 5-methylaminomethyl uracil; 5-methoxy amino methyl-2-thiouracil; β-D-mannosylqueosine; 5-methoxycarbonylmethyluracil; 5-methoxyuracil; 2-methylthio-N6-isopentenyladenine; uracil-5-oxyacetic acid methyl ester; psueouracil; 2-thiocytosine; 5-methyl-2 thiouracil, 2-thiouracil; 4-thiouracil; 5-methyluracil; N-uracil-5-oxyacetic acid methylester; uracil 5-oxyacetic acid; queosine; 2-thiocytosine; 5-propyluracil; 5-propylcytosine; 5-ethyluracil; 5-ethylcytosine; 5-butyluracil; 5-pentyluracil; 5-pentylcytosine; and 2,6,-diaminopurine; methylpsuedouracil; 1-methylguanine; 1-methylcytosine. Backbone modifications are similarly known in the art, and include, chemical modifications to the phosphate linkage (e.g., phosphorodiamidate, phosphorothioate (PS), N3'phosphoramidate (NP), boranophosphate, 2',5'phosphodiester, amide-linked, phosphonoacetate (PACE), morpholino, peptide nucleic acid (PNA) and inverted linkages (5'-5' and 3'-3' linkages)) and sugar modifications (e.g., 2'-O-Me, UNA, LNA).

The oligonucleotides described herein may be synthesized using standard solid or solution phase synthesis techniques which are known in the art. In certain embodiments, the oligonucleotides are synthesized using solid-phase phosphoramidite chemistry (U.S. Pat. No. 6,773,885) with automated synthesizers. Chemical synthesis of nucleic acids allows for the production of various forms of the nucleic acids with modified linkages, chimeric compositions, and nonstandard bases or modifying groups attached in chosen places through the nucleic acid's entire length.

Certain embodiments of the invention encompass isolated or substantially purified nucleic acid compositions. In the context of the present invention, an "isolated" or "purified" DNA molecule or RNA molecule is a DNA molecule or RNA molecule that exists apart from its native environment and is therefore not a product of nature. An isolated DNA molecule or RNA molecule may exist in a purified form or may exist in a non-native environment such as, for example, a transgenic host cell. For example, an "isolated" or "purified" nucleic acid molecule is substantially free of other cellular material or culture medium when produced by recombinant techniques, or substantially free of chemical precursors or other chemicals when chemically synthesized. In one embodiment, an "isolated" nucleic acid is free of sequences that naturally flank the nucleic acid (i.e., sequences located at the 5' and 3' ends of the nucleic acid) in the genomic DNA of the organism from which the nucleic acid is derived.

By "portion" or "fragment," as it relates to a nucleic acid molecule, sequence or segment of the invention, when it is linked to other sequences for expression, is meant a sequence having at least, e.g., about 80 nucleotides, 150 nucleotides, or 400 nucleotides. If not employed for expressing, a "portion" or "fragment" means at least, e.g., about 9, 12, 15, or 20 consecutive nucleotides, e.g., probes and primers (oligonucleotides), corresponding to the nucleotide sequence of the nucleic acid molecules of the invention.

"Recombinant DNA molecule" is a combination of DNA sequences that are joined together using recombinant DNA technology and procedures used to join together DNA sequences as described, for example, in Sambrook and Russell, Molecular Cloning: A Laboratory Manual, Cold Spring Harbor, NY: Cold Spring Harbor Laboratory Press ($3^{rd}$ edition, 2001).

"Homology" refers to the percent identity between two polynucleotides or two polypeptide sequences. Two DNA or polypeptide sequences are "homologous" to each other when the sequences exhibit at least about 75% to 85% (including 75%, 76%, 77%, 78%, 79%, 80%, 81%, 82%, 83%, 84%, and 85%), at least about 90%, or at least about 95% to 99% (including 95%, 96%, 97%, 98%, 99%) contiguous sequence identity over a defined length of the sequences.

The following terms are used to describe the sequence relationships between two or more nucleotide sequences: (a) "reference sequence," (b) "comparison window," (c) "sequence identity" (d) "percentage of sequence identity," (e) "substantial identity" and (f) "complementarity".

(a) As used herein, "reference sequence" is a defined sequence used as a basis for sequence comparison. A reference sequence may be a subset or the entirety of a specified sequence; for example, as a segment of a full-length cDNA or gene sequence, or the complete cDNA or gene sequence.

(b) As used herein, "comparison window" makes reference to a contiguous and specified segment of a polynucleotide sequence, wherein the polynucleotide sequence in the comparison window may comprise additions or deletions (i.e., gaps) compared to the reference sequence (which does not comprise additions or deletions) for optimal alignment of the two sequences. Generally, the comparison window is at least 20 contiguous nucleotides in length, and optionally can be 30, 40, 50, 100, or longer. Those of skill in the art understand that to avoid a high similarity to a reference sequence due to inclusion of gaps in the polynucleotide sequence a gap penalty is typically introduced and is subtracted from the number of matches.

Methods of alignment of sequences for comparison are well-known in the art. Thus, the determination of percent identity, including sequence complementarity, between any two sequences can be accomplished using a mathematical algorithm. Non-limiting examples of such mathematical algorithms are the algorithm of Myers and Miller (Myers and Miller, CABIOS, 4, 11 (1988)); the local homology algorithm of Smith et al. (Smith et al., Adv. Appl. Math., 2, 482 (1981)); the homology alignment algorithm of Needleman and Wunsch (Needleman and Wunsch, JMB, 48, 443 (1970)); the search-for-similarity-method of Pearson and Lipman (Pearson and Lipman, Proc. Natl. Acad. Sci. USA, 85, 2444 (1988)); the algorithm of Karlin and Altschul (Karlin and Altschul, Proc. Natl. Acad. Sci. USA, 87, 2264 (1990)), modified as in Karlin and Altschul (Karlin and Altschul, Proc. Natl. Acad. Sci. USA 90, 5873 (1993)).

Computer implementations of these mathematical algorithms can be utilized for comparison of sequences to determine sequence identity or complementarity. Such implementations include, but are not limited to: CLUSTAL in the PC/Gene program (available from Intelligenetics, Mountain View, Calif.); the ALIGN program (Version 2.0) and GAP, BESTFIT, BLAST, FASTA, and TFASTA in the Wisconsin Genetics Software Package, Version 8 (available from Genetics Computer Group (GCG), 575 Science Drive, Madison, Wis., USA). Alignments using these programs can be performed using the default parameters. The CLUSTAL program is well described by Higgins et al. (Higgins et al., CABIOS, 5, 151 (1989)); Corpet et al. (Corpet et al., Nucl. Acids Res., 16, 10881 (1988)); Huang et al. (Huang et al., CABIOS, 8, 155 (1992)); and Pearson et al. (Pearson et al., Meth. Mol. Biol., 24, 307 (1994)). The ALIGN program is based on the algorithm of Myers and Miller, supra. The BLAST programs of Altschul et al. (Altschul et al., JMB, 215, 403 (1990)) are based on the algorithm of Karlin and Altschul supra.

Software for performing BLAST analyses is publicly available through the National Center for Biotechnology Information. This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold. These initial neighborhood word hits act as seeds for initiating searches to find longer HSPs containing them. The word hits are then extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when the cumulative alignment score falls off by the quantity X from its maximum achieved value, the cumulative score goes to zero or below due to the accumulation of one or more negative-scoring residue alignments, or the end of either sequence is reached.

In addition to calculating percent sequence identity, the BLAST algorithm also performs a statistical analysis of the similarity between two sequences. One measure of similarity provided by the BLAST algorithm is the smallest sum probability (P(N)), which provides an indication of the probability by which a match between two nucleotide or amino acid sequences would occur by chance. For example, a test nucleic acid sequence is considered similar to a reference sequence if the smallest sum probability in a comparison of the test nucleic acid sequence to the reference nucleic acid sequence is less than about 0.1, less than about 0.01, or even less than about 0.001.

To obtain gapped alignments for comparison purposes, Gapped BLAST (in BLAST 2.0) can be utilized. Alternatively, PSI-BLAST (in BLAST 2.0) can be used to perform an iterated search that detects distant relationships between molecules. When utilizing BLAST, Gapped BLAST, PSI-BLAST, the default parameters of the respective programs (e.g., BLASTN for nucleotide sequences, BLASTX for proteins) can be used. The BLASTN program (for nucleotide sequences) uses as defaults a wordlength (W) of 11, an expectation (E) of 10, a cutoff of 100, M=5, N=−4, and a comparison of both strands. For amino acid sequences, the BLASTP program uses as defaults a wordlength (W) of 3, an expectation (E) of 10, and the BLOSUM62 scoring matrix. Alignment may also be performed manually by inspection.

For purposes of the present invention, comparison of nucleotide sequences for determination of percent sequence identity may be made using the BlastN program (version 1.4.7 or later) with its default parameters or any equivalent program. By "equivalent program" is intended any sequence comparison program that, for any two sequences in question, generates an alignment having identical nucleotide or amino acid residue matches and an identical percent sequence identity when compared to the corresponding alignment generated by the program.

(c) As used herein, "sequence identity" or "identity" in the context of two nucleic acid or polypeptide sequences makes reference to a specified percentage of residues in the two sequences that are the same when aligned for maximum correspondence over a specified comparison window, as measured by sequence comparison algorithms or by visual inspection.

(d) As used herein, "percentage of sequence identity" means the value determined by comparing two optimally aligned sequences over a comparison window, wherein the portion of the polynucleotide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison, and multiplying the result by 100 to yield the percentage of sequence identity.

(e)(i) The term "substantial identity" of polynucleotide sequences means that a polynucleotide comprises a sequence that has at least 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, or 94%, or even at least 95%, 96%, 97%, 98%, or 99% sequence identity, compared to a reference sequence using one of the alignment programs described using standard parameters.

For sequence comparison, typically one sequence acts as a reference sequence to which test sequences are compared. When using a sequence comparison algorithm, test and reference sequences are input into a computer, subsequence coordinates are designated if necessary, and sequence algorithm program parameters are designated. The sequence comparison algorithm then calculates the percent sequence identity for the test sequence(s) relative to the reference sequence, based on the designated program parameters.

Another indication that nucleotide sequences are substantially identical is if two molecules hybridize to each other under stringent conditions. Generally, stringent conditions are selected to be about 5° C. lower than the thermal melting point ($T_m$) for the specific sequence at a defined ionic strength and pH. However, stringent conditions encompass temperatures in the range of about 1° C. to about 20° C., depending upon the desired degree of stringency as otherwise qualified herein. Nucleic acids that do not hybridize to each other under stringent conditions are still substantially identical if the polypeptides they encode are substantially identical. This may occur, e.g., when a copy of a nucleic acid is created using the maximum codon degeneracy permitted by the genetic code. One indication that two nucleic acid sequences are substantially identical is when the polypeptide encoded by the first nucleic acid is immunologically cross reactive with the polypeptide encoded by the second nucleic acid.

The phrase "hybridizing specifically to" refers to the binding, duplexing, or hybridizing of a molecule only to a particular nucleotide sequence under stringent conditions when that sequence is present in a complex mixture (e.g., total cellular) DNA or RNA. "Bind(s) substantially" refers to complementary hybridization between a probe nucleic acid and a target nucleic acid and embraces minor mismatches that can be accommodated by reducing the stringency of the hybridization media to achieve the desired detection of the target nucleic acid sequence.

(f) The term "complementary" as used herein refers to the broad concept of complementary base pairing between two nucleic acids aligned in an antisense position in relation to each other. When a nucleotide position in both of the molecules is occupied by nucleotides normally capable of base pairing with each other, then the nucleic acids are considered to be complementary to each other at this position. Thus, two nucleic acids are substantially complementary to each other when at least, e.g., about 50%, at least about 60% or at least about 80% of corresponding positions in each of the molecules are occupied by nucleotides which normally base pair with each other (e.g., A:T (A:U for RNA) and G:C nucleotide pairs).

As used herein, the term "derived" or "directed to" with respect to a nucleotide molecule means that the molecule has complementary sequence identity to a particular molecule of interest.

The term "mammal" as used herein refers to humans, higher non-human primates, rodents, domestic, cows, horses, pigs, sheep, dogs and cats. In one embodiment, the mammal is a human.

The term "therapeutically effective amount," in reference to treating a disease state/condition, refers to an amount of a therapeutic agent that is capable of having any detectable, positive effect on any symptom, aspect, or characteristics of a disease state/condition when administered as a single dose or in multiple doses. Such effect need not be absolute to be beneficial.

The terms "treat" and "treatment" refer to both therapeutic treatment and prophylactic or preventative measures, wherein the object is to prevent or decrease an undesired physiological change or disorder. For purposes of this invention, beneficial or desired clinical results include, but are not limited to, alleviation of symptoms, diminishment of extent of disease, stabilized (i.e., not worsening) state of disease, delay or slowing of disease progression, amelioration or palliation of the disease state, and remission (whether partial or total), whether detectable or undetectable. "Treatment" can also mean prolonging survival as compared to expected survival if not receiving treatment. Those in need of treatment include those already with the condition or disorder as well as those prone to have the condition or disorder or those in which the condition or disorder is to be prevented.

The invention will now be illustrated by the following non-limiting Examples.

Example 1. A Duo-Toehold-Mediated Displacement Reaction on DNA Tetrahedron for RNA Detection Since Rothemund established the first DNA origami in 2006, this unique technique has garnered worldwide interest amongst researchers. Simply by using the complementary property of base pairs, highly selective double helixes can be formed in different spatial forms. For example, DNA tetrahedrons, which are one of the simplest spatial DNA forms, can be used to provide a rigid structure for further application. The stability of the tetrahedron form strongly restricts the distance between each position on the tetrahedron, making it an optimal optical probe for target detection using Förster resonance energy transfer (FRET). The only problem is that the concentration of virus RNA is very low at the early stage, and therefore, the signal needs to be amplified for proper detection. Toehold-mediated displacement reaction (TMDR) is an ideal approach to achieve this goal under moderate conditions. TMDR is a kinetic-controlled non-enzymatic process. In this process, a single stranded oligonucleotide (referred to as toehold), which neighbors to a double strand helix, mediates a displacement with another single stranded oligonucleotide. This process can occur automatically at room temperature without any other assistance and has been applied to many fields, such as logic gates, catalysts or self-assembly. Now, a duo-TMDR amplification on a DNA tetrahedron for sensitively detecting an RNA sequence is described herein (FIG. 1). In the first TMDR process, target RNA annealed to a complementary DNA sequence via a first toehold and displaced a protector DNA and recovered fluorescence. In the second TMDR process, capture DNA displaced the target RNA via a second toehold. The target RNA can then be recycled in the first TMDR process and form an amplifying loop, thereby enhancing the fluorescence signal. Moreover, with the help of single molecule detection technique, 0.1 attomolar of target RNA could be detected.

Results and Discussion

To ensure the stability and efficiency for the detection, DNA tetrahedron was designed to maintain its rigid structure. Four DNAs (DNA1-DNA 4, see Table 1 for sequence details) were used to construct the frame of the tetrahedron. The tetrahedron had five 20 bp double stranded edges and one edge with a 28-base single strand. Fluorescent organic dye tetrachlorofluorescein (TET) was labeled on the 5' end of DNA 4, which was at the vertex of the tetrahedron neighboring to the single strand. Protector DNA, which was modified with black hole quencher 1 (BHQ-1) on its 3' end, was also annealed to the tetrahedron on the single strand side and left a few bases beyond its 3' end as the first toehold. At this stage, the fluorescence of TET could be quenched by BHQ-1 due to the FRET process. Once the target RNA was added to the solution, the first TMDR process could be triggered automatically. Protector DNA could be displaced and recover the fluorescence of TET. Once the protector DNA was displaced, the second toehold beyond the 5' end of target RNA could be exposed. If capture DNA was also in the solution, the second TMDR process could be triggered and target RNA could be displaced. The displaced target RNA could be recycled in this process, displace more protector DNA and amplify the signal (FIG. 1). There were two purposes of designing the protector DNA, the first was to quench the fluorescence of TET and form the "FRET-on" status; the second was to prevent the single strand on the tetrahedron to anneal with capture DNA directly.

TABLE 1

Sequence detail of the nucleic acid used in this study.
The toeholds are shown in italic. Recognition regions are shown
in bold. Amplification regions are underlined.

| Name | Nucleic Acid Type | Sequence (5' to 3') | Modification | Length |
|---|---|---|---|---|
| DNA 1 | DNA | TGC TCT TCC CGA *GAT* <u>GCA</u> AGG TCG CAT ATG AGC *AAC TCC CAC* TCA ACT GCC TGG TGA TAC GAG GAT GGG CA (SEQ ID NO: 1) | N/A | 71 |
| DNA 2 | DNA | GGT GAT AAA ACG TGT AGC AAG CTG TAA TCG ACG GGA AGA GCA TGC CCA TCC ACT ACT ATG GCG (SEQ ID NO: 2) | N/A | 63 |
| DNA 3 | DNA | AGG CAG TTG AGA CGA ACA TTC CTA AGT CTG AAA TTT ATC ACC CGC CAT AGT AGA CGT ATC ACC (SEQ ID NO: 3) | N/A | 63 |
| DNA 4 | DNA | TCG ATT ACA GCT TGC TAC ACG ATT CAG ACT TAG GAA TGT TCG T (SEQ ID NO: 4) | 5'-TET | 43 |
| Protector 17 | DNA | AGT TGC TCA TAT GCG AC (SEQ ID NO: 5) | 3'-BHQ1 | 17 |
| Protector 18 | DNA | AGT TGC TCA TAT GCG ACC (SEQ ID NO: 6) | 3'-BHQ1 | 18 |
| Protector 19 | DNA | AGT TGC TCA TAT GCG ACC T (SEQ ID NO: 7) | 3'-BHQ1 | 19 |
| Capture 22 | DNA | <u>GGG AGT TGC TCA TAT GCG ACC T</u> (SEQ ID NO: 8) | N/A | 23 |
| Capture 24 | DNA | <u>GGG AGT TGC TCA TAT GCG ACC TTG</u> (SEQ ID NO: 9) | N/A | 24 |
| Capture 25 | DNA | <u>GGG AGT TGC TCA TAT GCG ACC TTG C</u> (SEQ ID NO: 10) | N/A | 25 |
| Target Sequence | RNA | CUC AUA UGC GAC CUU GCA UC (SEQ ID NO: 11) | N/A | 20 |

Additional nucleic acids were generated to detect a Dengue virus target sequence. For these experiments, the sequences for DNA 2, DNA 3, and DNA 4 were identical to those in Table 1. The sequences for DNA 1, the protector DNA sequences, and the capture DNA sequences were based on a target Dengue virus sequence.

Figure 3A:
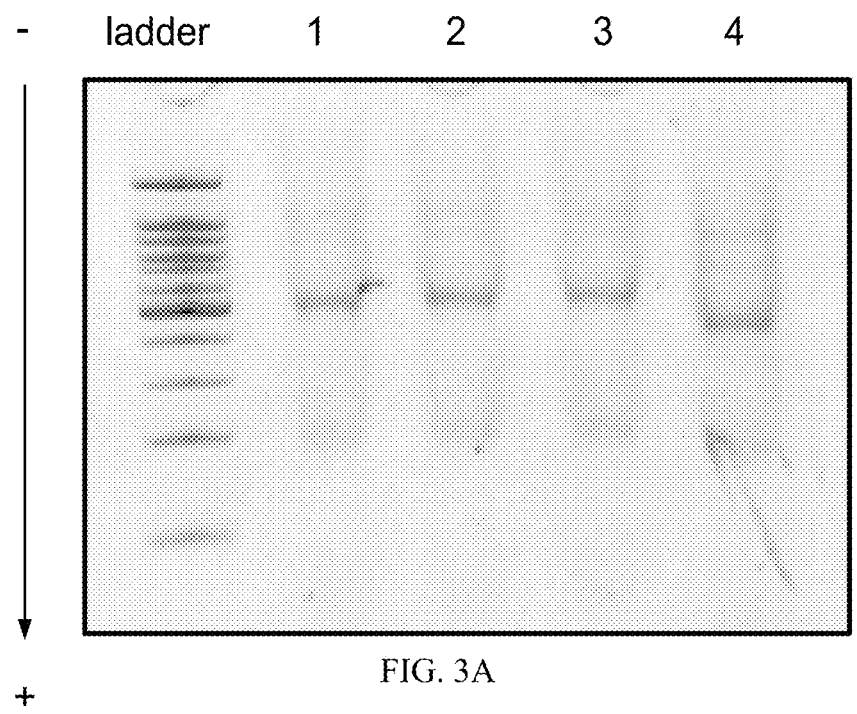
FIGS. 3A-3B. Confirmation for the DNA tetrahedron. A) the native polyacrylamide gel electrophoresis (PAGE) for the DNA tetrahedron annealed with different length of protector (lane 1 to 3 refer to protector of 17-nt, 18-nt and 19-nt DNA), 100 bps DNA ladder was on the left; B) the fluorescence spectra for DNA 4, DNA tetrahedron and different protector annealed DNA tetrahedron. The concentration of DNA 4 and DNA tetrahedron were 200 nM.
Figure 3B:
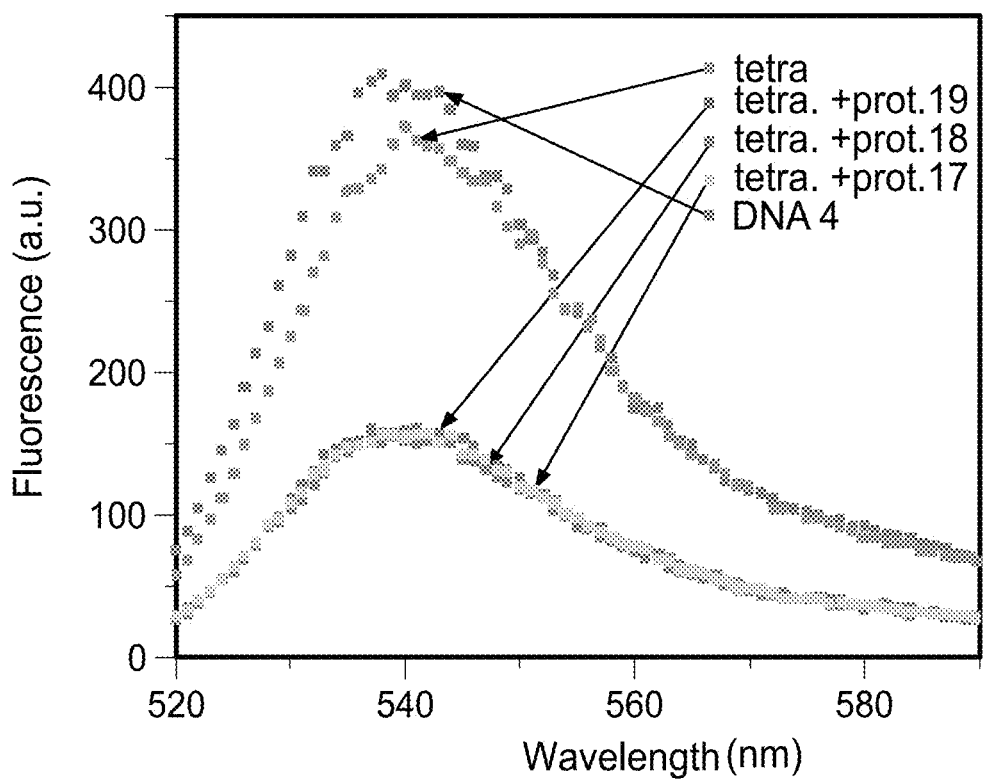
Figure 6:
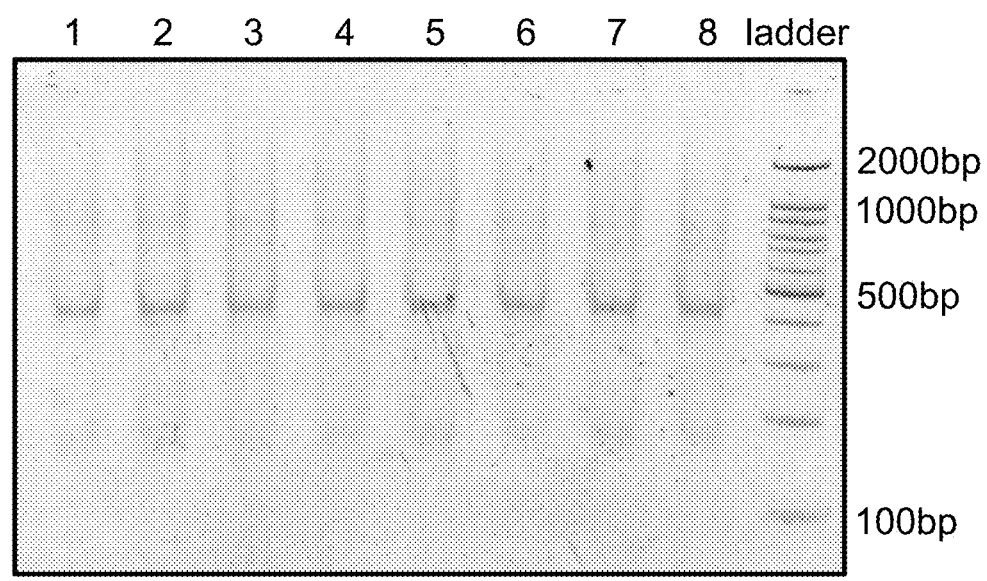
FIG. 6. The PAGE analysis for the repeatability of synthesis protector binding tetrahedron. Lane 1 to 8 were different batches of protector binding tetrahedron. The concentration of protector binding tetrahedron was 100 nM.
Figure 7A:
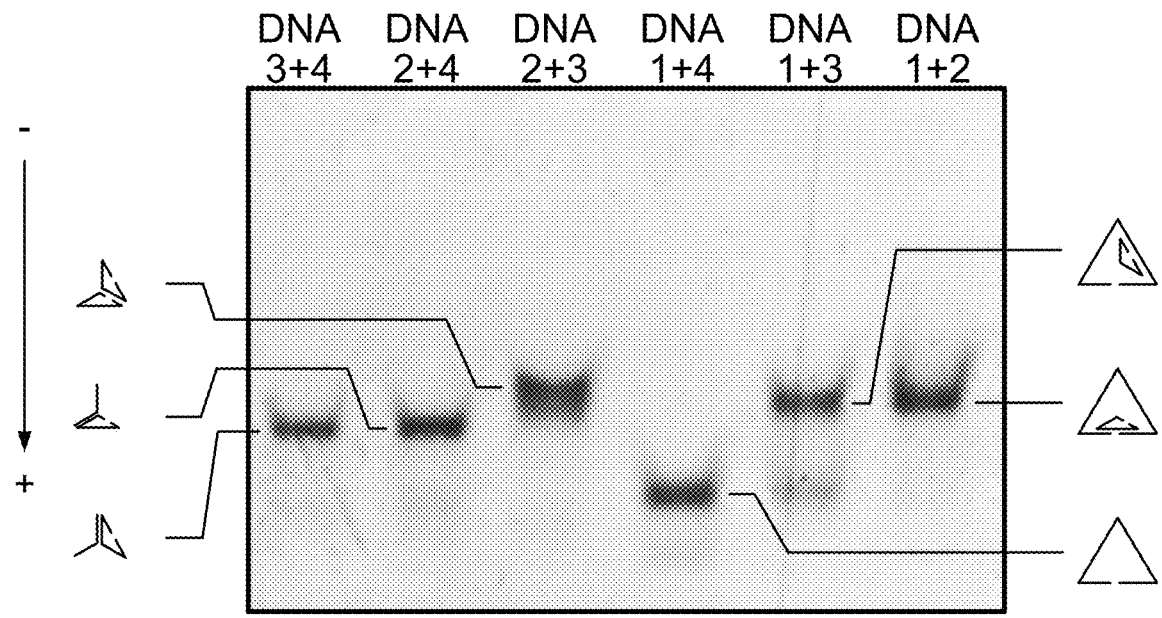
FIGS. 7A-7B. The PAGE analysis for the legitimation of sequence design. A) the native PAGE for pairwise DNA hybridization; B) the native PAGE for triple-wise DNA hybridization.
Figure 7B:
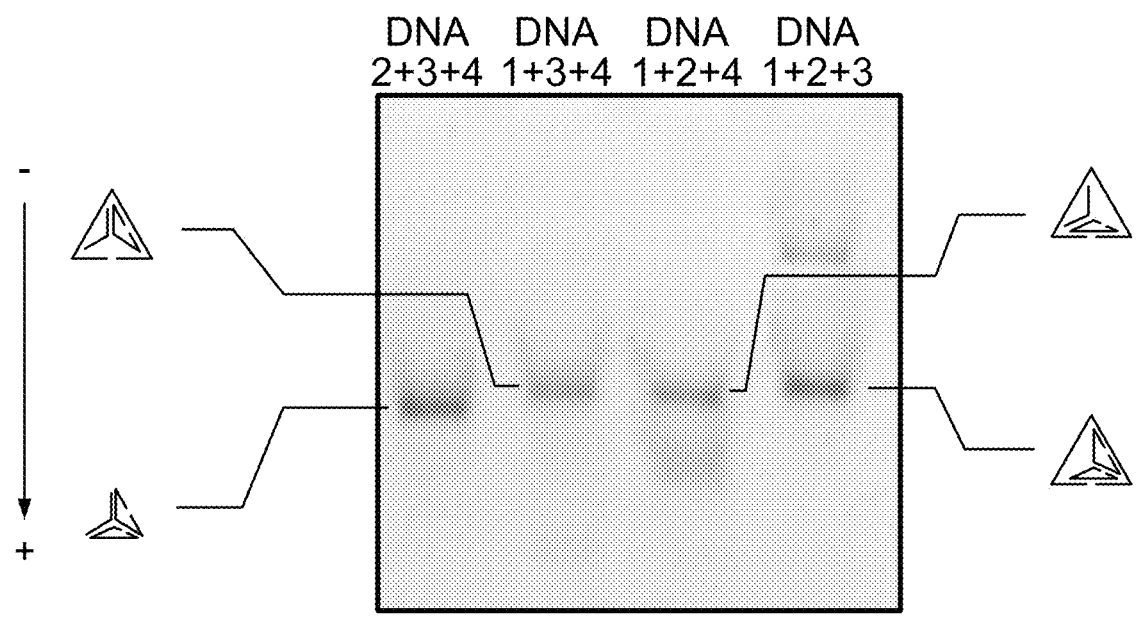
Figure 8A:
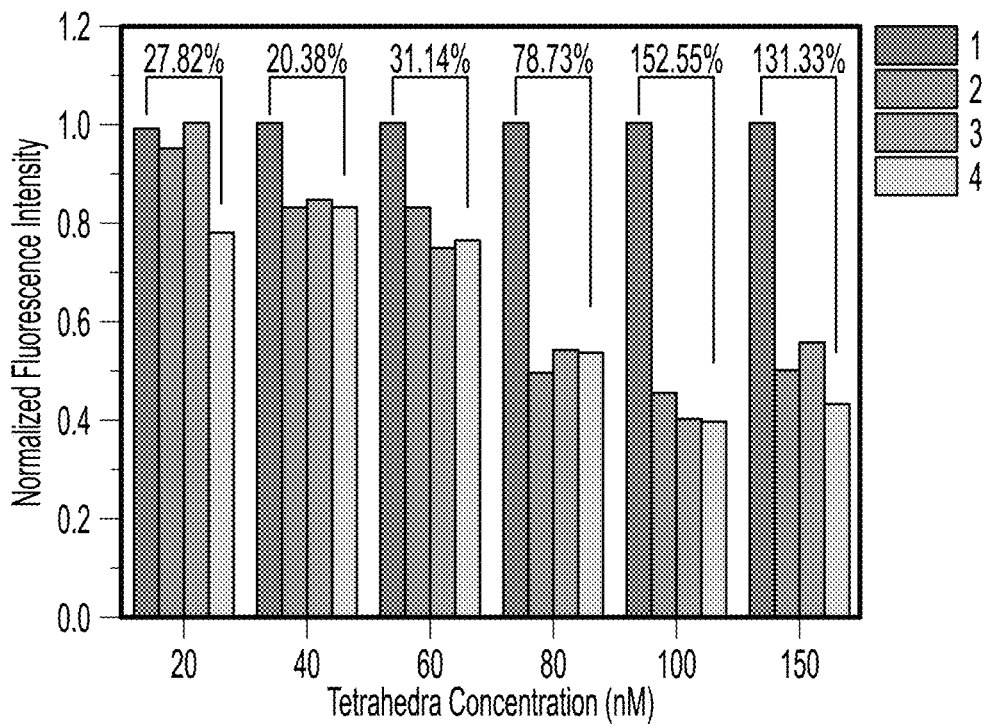
FIGS. 8A-8B. The fluorescence for the optimization of duo-TMDR. A) Optimizing the concentration of protector annealed DNA tetrahedron for reaction. Bars 1 to 4 represent protector binding tetrahedron with target RNA and capture DNA, protector binding tetrahedron with target RNA, protector binding tetrahedron with capture DNA and protector binding tetrahedron only, respectively. Bars 1 to 4 are shown in order from left to right for each tetrahedron concentration. The concentration of target RNA was 5 nM and capture DNA was 100 nM; B) Optimizing the pH value for reaction, the concentration of protector binding tetrahedron was 100 nM and the concentration of target RNA and capture DNA were 5 nM and 100 nM, respectively. The control has no target RNA presented.
Figure 8B:
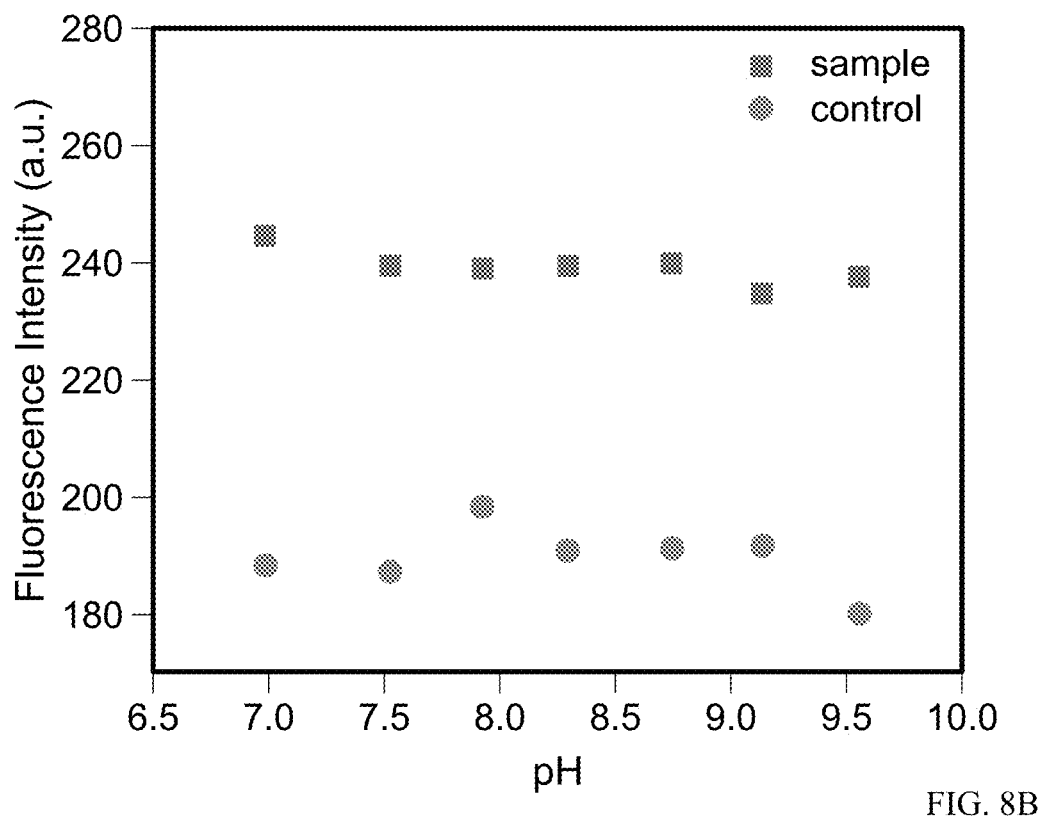

The formation of DNA tetrahedron could be clearly verified by the native polyacrylamide gel electrophoresis (PAGE) (FIG. 3a). Different lengths of protector DNAs were used to form the protected tetrahedron (p-TETRA). A single strand indicated the tetrahedron (TETRA) and P-TETRA with different protector DNA could be formed with high efficiency. High repeatability could also be achieved since the sequence of DNA was carefully designed (FIG. 6). The fluorescence also indicated the formation of the P-TETRA (FIG. 3b). In the absence of protector DNA, the fluorescence of TET could be slightly quenched due to the heating process. However, the addition of protector DNAs could severely quench the fluorescence with an efficiency of 59.6%. The length of protector DNA could barely influence the quenching efficiency since the distance between the organic fluorescent dye and quencher were only two bases difference. For the FRET model, the interaction between dipole and dipole followed the power law distance dependence and the FRET distance $R_0$ (50% quenching distance) could be described as:

$$R_0 = 9.78 \times 10^3 (\kappa^2 n^{-4} Q_{dye} J)^{1/6} \quad (1)$$

in which, $\kappa^2$ is the dipole orientation factor and is always 2/3, n is the refractive index of the medium (1.333 for water medium), $Q_{dye}$ is the quantum yield of TET and J is the overlap integral between the emission of TET and the absorption of BHQ-1. The theoretical quenching efficiency of FRET ($\eta_{FRET}$) follows the 6$^{th}$-power law and is described as:

$$\eta_{FRET} = \frac{1}{1 + \left(\frac{r}{R_0}\right)^6} \quad (2)$$

where the r is the actual distance between TET and BHQ-1. The calculated $R_0$ was 4.41 nm. The value of r could be longer than the 8 bases (3.6 nm) considering the twist angle and the diameter of DNA helix structure. In this circumstance, the r was 3.95 nm and the calculated a was 0.659, which agreed with the experimental result. Pairwise and triple-wise hybridization was also performed to verify the design of the sequences were legitimate (FIGS. 7a and 7b).

Figure 4A:
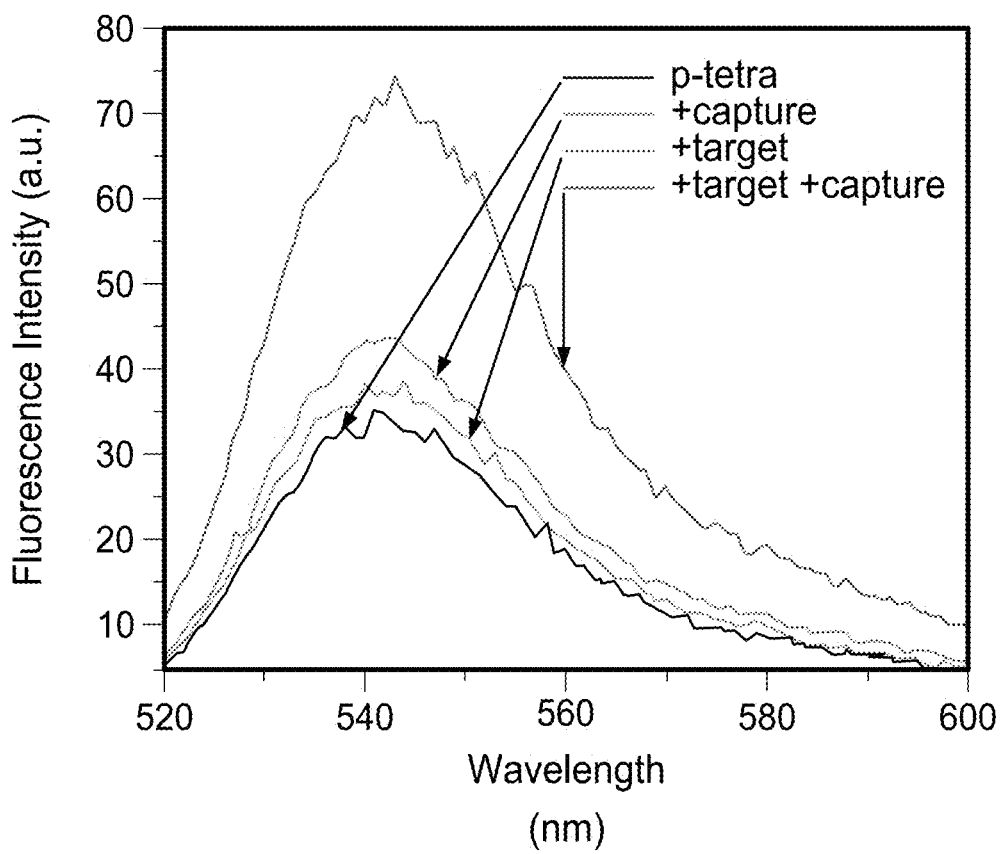
FIGS. 4A-4C. Confirmation of the occurrence of duo-TMDR process. A) fluorescence spectra of fluorophore (TET) at different stages of reaction; B) the native PAGE of DNA tetrahedron at different stages of reaction, lane 1 to 3 represented protector binding tetrahedron, protector binding tetrahedron with target RNA, and protector binding tetrahedron with target RNA and capture DNA; C) fluorescence lifetime of TET at different stages of reaction.
Figure 4B:
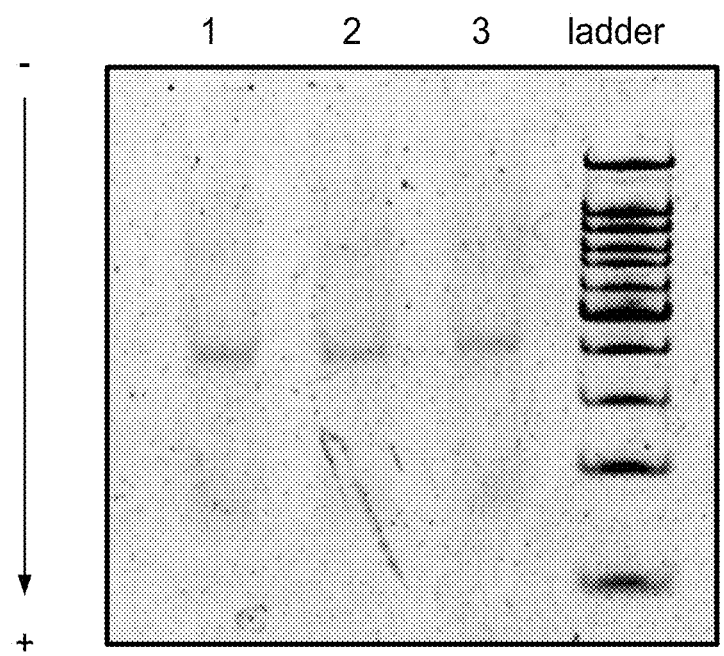
Figure 4C:
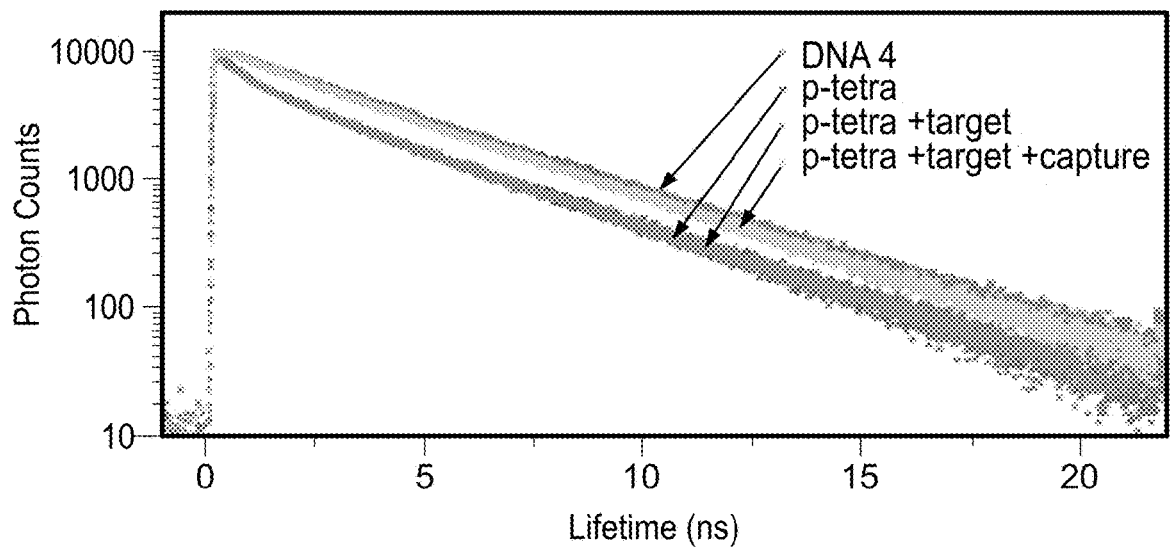

The feasibility of this duo-toehold-mediated displacement reaction was first tested (FIG. 4a). By adding target RNA or capture DNA separately, the fluorescence of the mixture could hardly be recovered. This is because the addition of only target could just trigger the first toehold-mediated displacement reaction. Displacing the protector can switch off the FRET process between TET and BHQ-1 and restore the fluorescence, but the difference was too small and could not be told by the spectrum, which meant that the traditional FRET process could not distinguish the existence of the target at this level. Meanwhile, the reacting site for the second toehold-mediated displacement reaction was blocked by protector DNA, and therefore, the addition of only capture DNA could not restore the fluorescence either. Only when both the target and capture were added, the two toehold-mediated displacement reactions could be activated simultaneously and the fluorescence could be restored with a recovering efficiency of 142.8%, which was almost fully recovered to the fluorescence intensity of TETRA. The displacement reaction could also be observed from the PAGE (FIG. 4b). By only adding the target RNA (lane 2), the migrating rate was not changed from the P-TETRA (lane 1). By adding both target RNA and capture DNA, the protector DNA on the P-TETRA would eventually be displaced by capture DNA. The additional 8 bases were manifested by slower migrating rate on the gel (lane 3). The average fluorescence lifetime was also measured could indicate the occurrence of this duo-TMDR process more clearly (FIG. 4c and Table 2).

The initial lifetime of TET on DNA 4 was 3.550 ns. A small proportion of fast component was contributed by the rotation restriction of DNA. However, by forming the p-TETRA, the fluorescence lifetime decreased to 1.552 ns. The quenching efficiency of lifetime was contributed by both radiative, non-radiative decay and FRET, which referred as total quenching efficiency ($\eta_{total}$) and can be described as:

$$\eta_{total} = 1 - \frac{\tau_N}{\tau_0} \quad (3)$$

where the $\tau_N$ is the lifetime of p-TETRA and $\tau_0$ is the lifetime of TET-labelled DNA-4. The $\eta_{total}$ was 0.563, which was identical with the quenching efficiency in fluorescence spectra and the $\eta_{FRET}$. That was to say, the quenching of fluorescence was mostly contributed to the occurrence of FRET. The addition of only target RNA could hardly recover the lifetime of TET. However, by adding both target RNA and capture DNA, the fluorescence lifetime could be recovered to 3.168 ns, which proved the displacement quencher labeled protector DNA and switched off the FRET process. The fast component in recovered p-TETRA was a little higher than DNA-4, this was because the tetrahedron DNA could handicap the free rotation of TET more severely than single strand DNA.

Figure 9A:
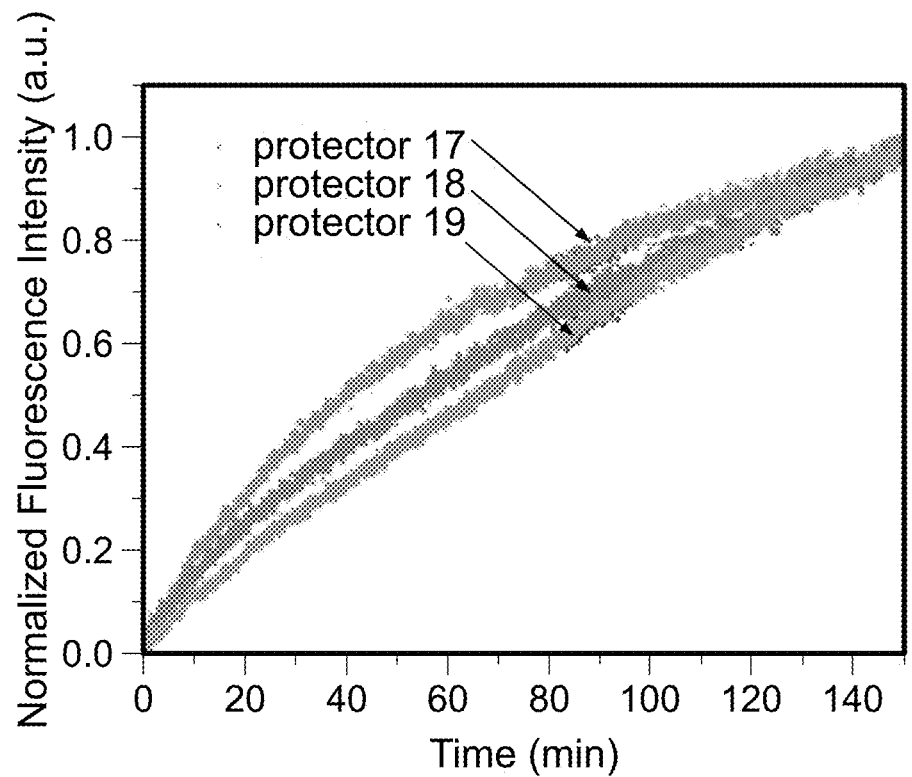
FIGS. 9A-9B. The dynamic fluorescence intensity related to reaction time by changing the length of protector DNA (A) or the capture DNA (B). The concentration of protector binding tetrahedron was 100 nM and the concentration of target RNA and capture DNA were 5 nM and 100 nM respectively.
Figure 9B:
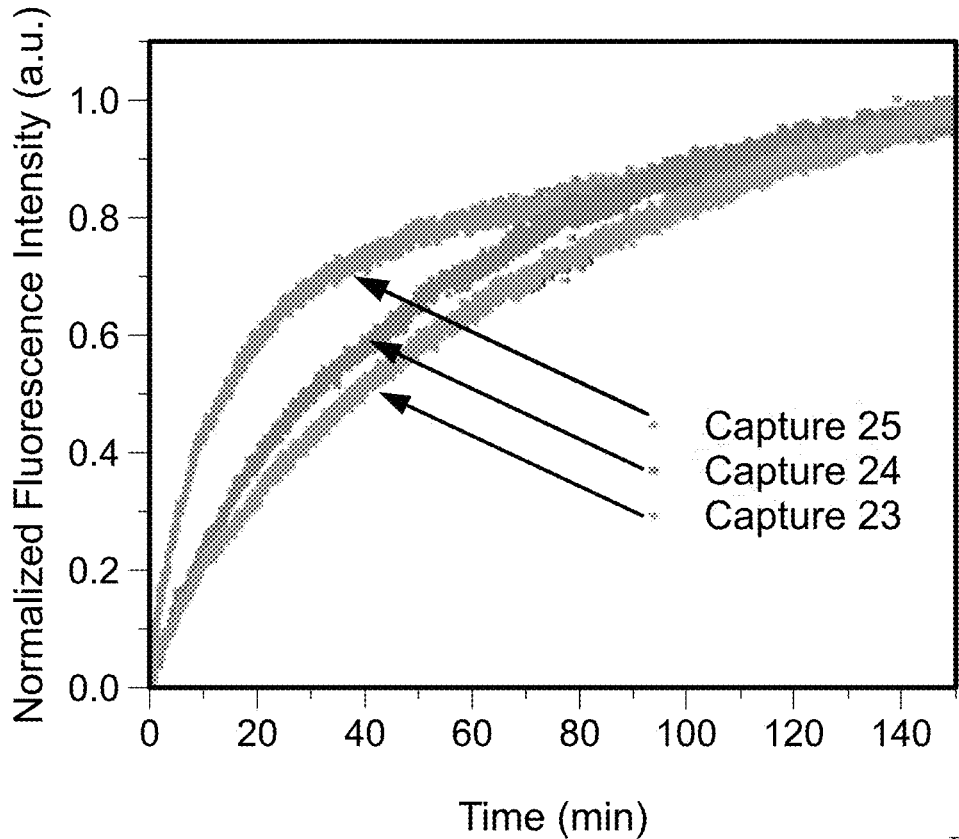

The same target RNA and capture DNA were used to trigger the displacement reaction. The fluorescence signal was constantly measured for 150 min and the dynamic changes were recorded (FIG. 9a). When the protector with 17 bases was used to form the tetrahedron, the fastest recovering rate could be achieved, which manifested as the largest slope at the early stage. By using a protector with 17 bases, the length of the first toehold increased to 8 bases, and therefore, it was much easier for the target to displace the protector and recover the fluorescence signal. The influence of DNA length on the second toehold-mediated strand displacement reaction was also investigated. Protector 17 DNA was used to form the p-TETRA and capture DNA with different lengths were used along with the same concentration of target RNA (FIG. 9b). By using capture DNA with 25 bases, over 80% of fluorescence could be recovered within 60 min, which was much faster than the other two samples. This was because only 6 binding spots were left for target RNA by using capture 25 DNA, which is shorter than using other capture DNAs. Since the target RNA could be displaced easier and faster, the duo-TMDR process could be accelerated and manifested as a faster fluorescence recovering rate.

Figure 5A:
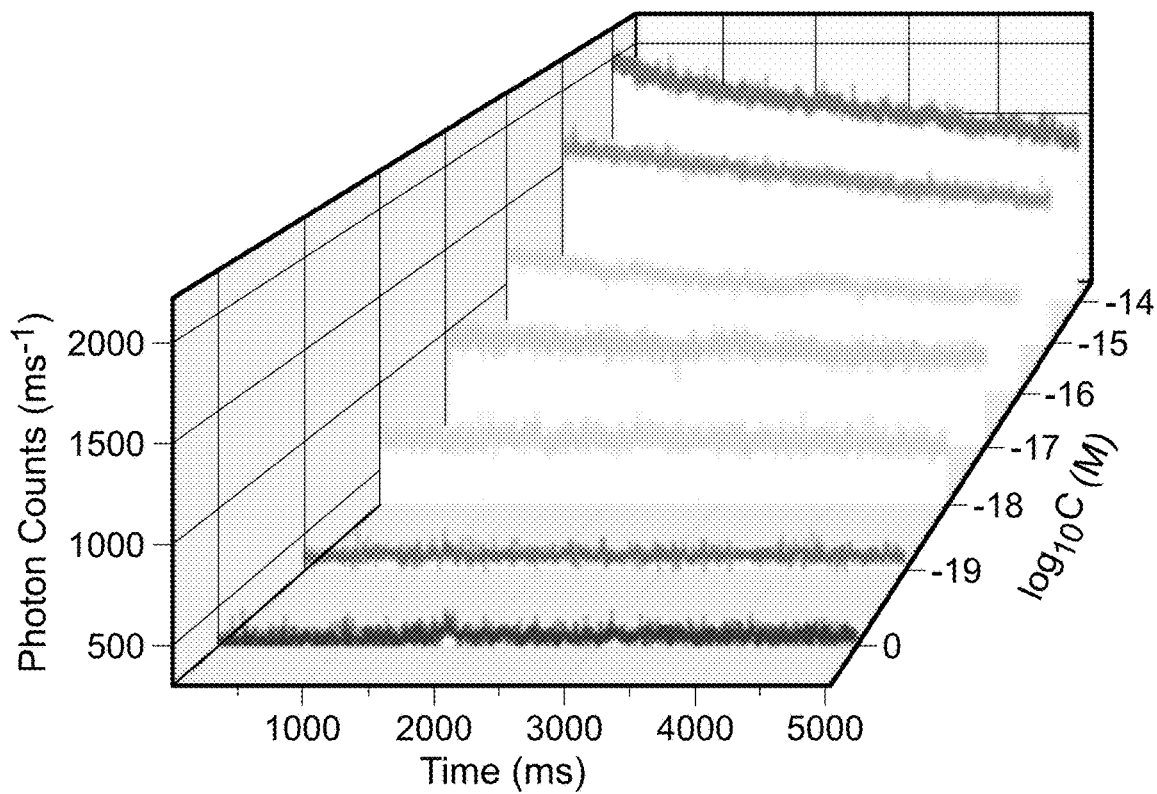
FIGS. 5A-5B. Single molecule detection of target RNA. A) The response traces of photon counts by adding different concentration of target RNA to the solution of protector binding tetrahedron and capture DNA; B) the average photon counts in 5 s by adding different concentration of target RNA to the solution of capture DNA contained protector binding tetrahedron (bottom line of spots) and only protector binding tetrahedron (top line of spots).
Figure 5B:
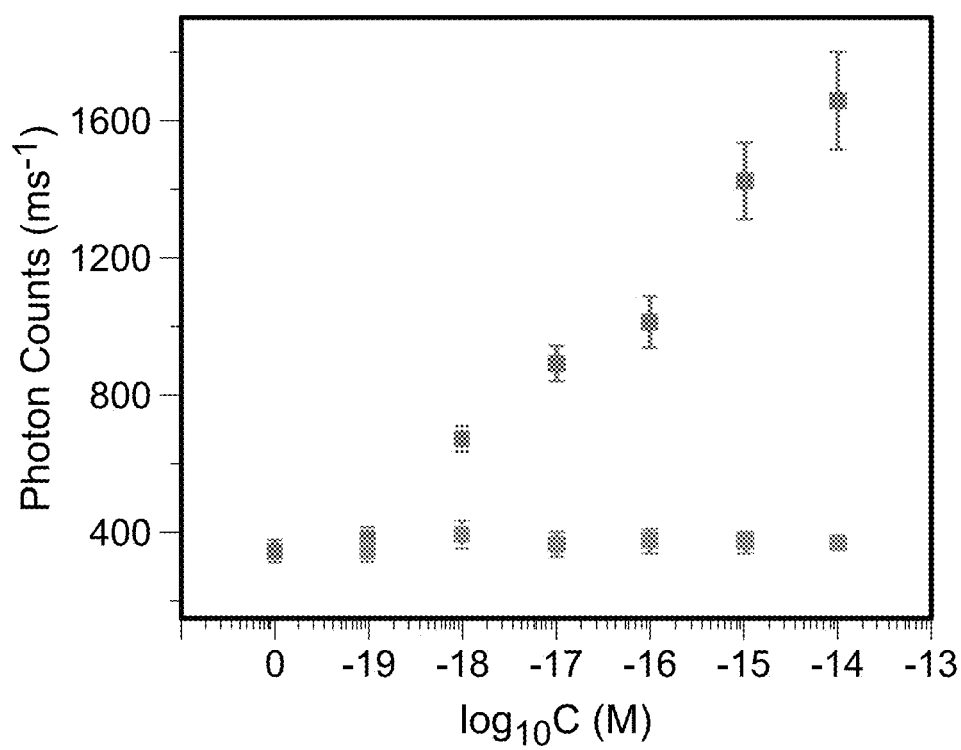
Figure 10A:
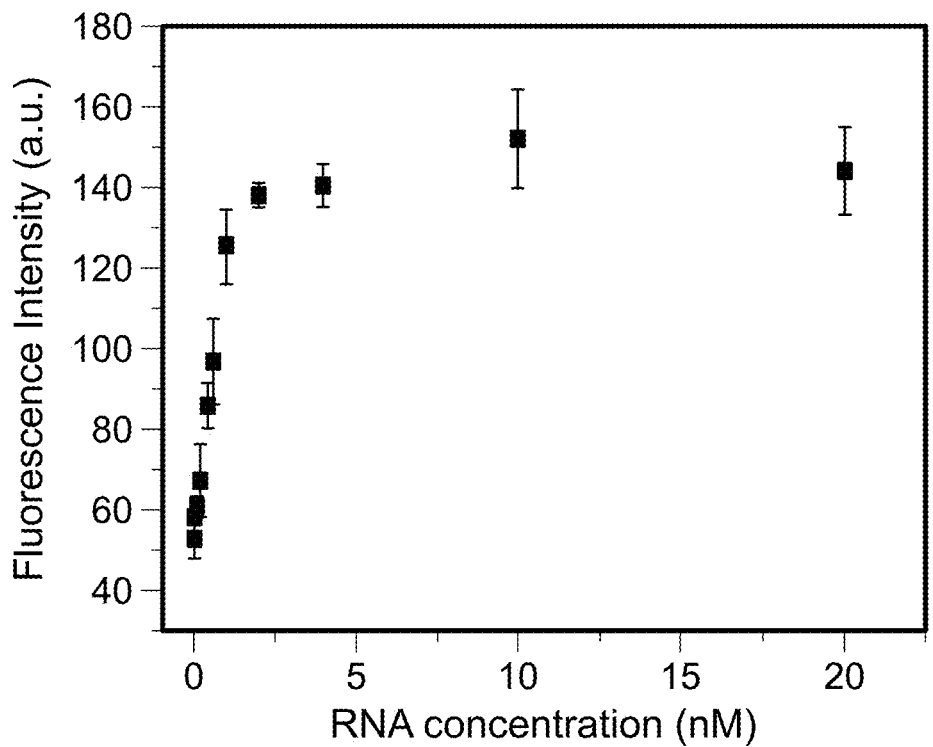
FIGS. 10A-B. Variance of fluorescence intensity as a function of the concentration of target RNA (A) in the range of 40 pM to 20 nM and (B) the linear fitting of the fluorescence intensity as a function of the concentration of target RNA in the range of 40 pM to 1 nM. The concentration of protector binding tetrahedron was 100 nM and the concentration of capture DNA was 100 nM.
Figure 10B:
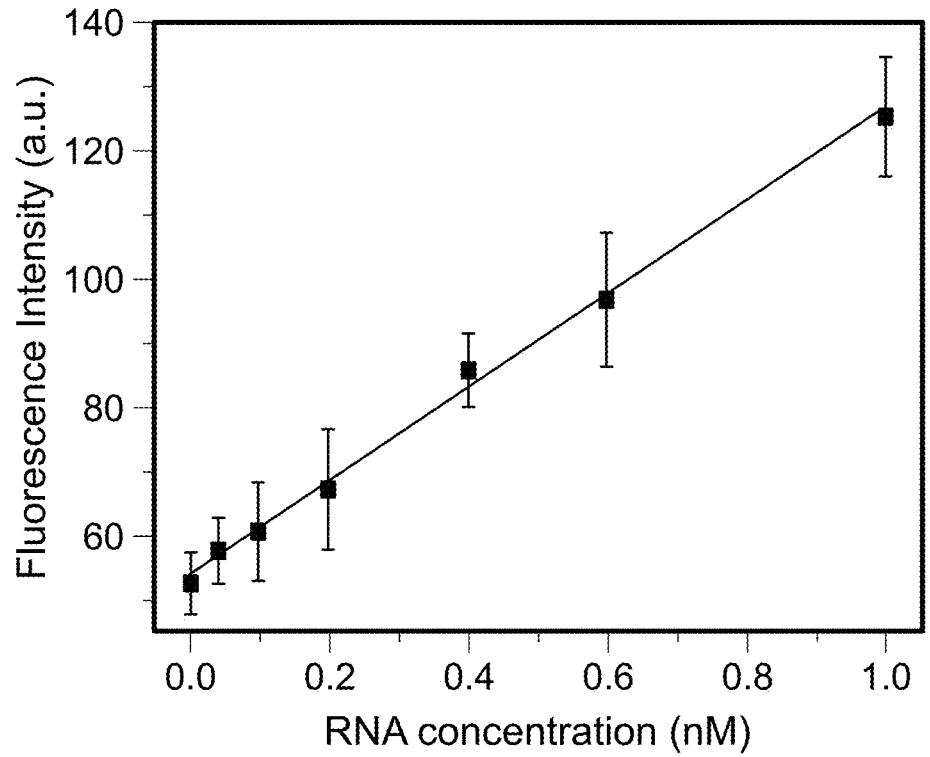

The concentration of dengue virus RNA was further quantified via two methods, the common spectrometer detection and the single-molecule detection. FIG. 10 shows the fluorescence intensity increased with the concentration of target RNA of dengue virus. A good linear relationship ($R^2 > 0.99$) could be found in the range of 40 pM to 1 nM and the limit of detection (LOD) was 15 pM ($3\sigma/k$). The sensitivity by using this duo-TMDR was much higher than the reported methods. FIG. 5a showed the response traces of photon counts with 5 s by using the single molecule detection. The photons, which generated from the emission of TET, associated with the concentration of target RNA. As the concentration of target RNA increased, more protector DNA could be displaced and switch off the FRET. By departing from the BHQ-1, more excited electrons could release the energy by radiatively emitting photons rather than in a non-radiative manner. Therefore, the higher concentration of target, the higher photon counts could be observed. As shown in FIG. 5b, by adding only target RNA to the p-TETRA, no significant changes could be observed

TABLE 2

Fluorescence lifetime for TET at different stage of reaction.

| | $\tau_1$ (ns) | $\alpha_1$ | $\tau_2$ (ns) | $\alpha_2$ | $\tau_3$ (ns) | $\alpha_3$ | $\bar{\tau}$ (ns)[a] |
|---|---|---|---|---|---|---|---|
| DNA 4 | 0.5584 | 0.1005 | 3.8847 | 0.8995 | n/a | n/a | 3.550 |
| p-TETRA | 0.1065 | 0.4197 | 0.8412 | 0.2228 | 3.694 | 0.3574 | 1.552 |
| p-TETRA + target RNA | 0.08724 | 0.3995 | 0.7935 | 0.2119 | 3.677 | 0.3885 | 1.632 |
| p-TETRA + target RNA + capture DNA | 0.4582 | 0.1774 | 3.752 | 0.8226 | n/a | n/a | 3.168 |

[a]the average fluorescent lifetime was calculated from the following equation:

$$\bar{\tau} = \sum_{i=1}^{n} (\tau_i \times \alpha_i)$$

For sensitive and rapid detection of target RNA, the length of protector DNA was studied since it was critical to the displacing rate in the reaction. Therefore, the influence of the length of the protector DNA to the dynamic fluorescence changes of p-TETRA was measured. Three oligonucleotides with different length were annealed to the tetrahedron as previously described and served as a protector. comparing to the p-TETRA. By adding capture DNA and different concentration of target RNA to the p-TETRA, the photon counts increased gradually. For 0.1 M ($10^{-19}$ M) of target RNA to trigger the duo-TMDR, the photon counts could increase from 346±33 ms$^{-1}$ to 387±28 ms$^{-1}$. In our experiments, the volume was set to 100 μL, which meant that only about six copies of target RNA were in the system.

It should be noted that simply by changing the sequence of DNA 1, this method could be used for the other targets detection.

Figure 11:
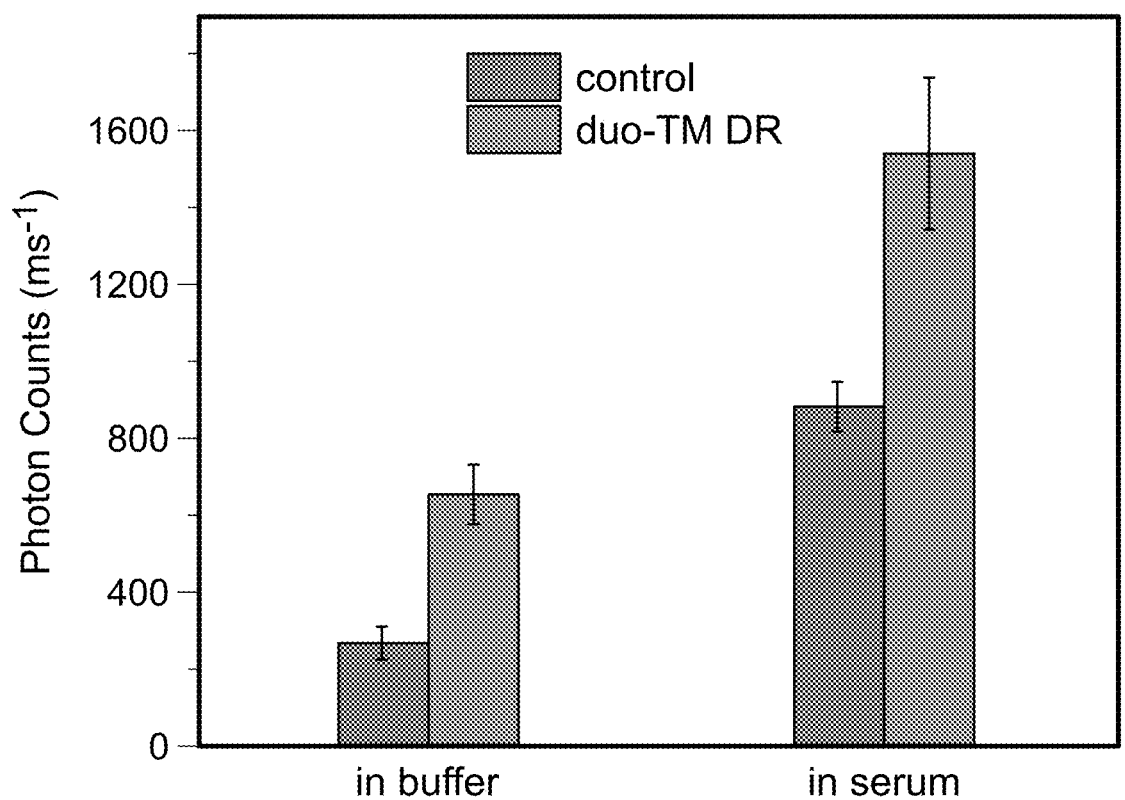
FIG. 11. The photon counts of control group (left) and the duo-TMDR group (right) in different medium (buffer or human serum). The concentration of protector binding tetrahedron was 100 nM and the concentration of target RNA and capture DNA were 10 aM and 100 nM respectively.

To demonstrate the stability of this method, the recovery of fluorescence was also performed in the present of 10% human serum by using the single molecule detection (FIG. 11). The presence of serum could not influence the recovery of fluorescence signal which indicated this method has potential usage in the practical application.

In conclusion, a noble approach for sensitively detecting RNA of dengue virus using the duo-TMDR process was developed. The protector DNA ensured the reaction could only occur when target presented. The presence of target RNA could displace the protector DNA and recover the fluorescence signal. Meanwhile, the exposed second toehold could anneal to capture DNA and displace target RNA. The displaced RNA could be recycled in the process and amplify the fluorescence signal. The detection limit of this method could reach sub-attomolar, where only about six copies of RNA was in the system. Moreover, this method could be compatible to detect other types of nucleic acids simply by changing the sequence on the p-TETRA. This method is rapid and sensitive and might be extended to the early-stage diagnosis.

Materials and Methods

Materials and Reagents. All DNA and RNA samples were purchased from Sangon Biotech Co., Ltd. (Shanghai, China). The sequences were listed in the Table 1 or were other sequences described herein. Magnesium chloride 6-hydrate was purchased from Mallinckrodt Pharmaceuticals (St. Louis, MO), Tris base was purchased from Geno Technology, Inc. (St. Louis, MO), ammonium persulfate (APS) and N,N,N',N'-tetramethylethylenediamine (TE-MED) were purchased from Sigma-Aldrich Co. LLC (St. Louis, MO), 40% acrylamide/bis-acrylamide solution was purchased from Thermo Fisher Scientific Inc. (Ward Hill, MA). All reagents are of analytical grade unless otherwise statements. Analog vortex mixer (VWR, Radnor, PA) was used to mix the solutions and 18.2 MΩ·cm $H_2O$ was used for all experiments.

DNA stock solutions. The purchased oligonucleotides were dissolved in 10 mM pH 8.0 Tris-HCl buffer with 10 mM $Mg^{2+}$ (referred to as TH-Mg buffer) and stored at −4° C. The as-mentioned buffer was used as reaction buffer throughout.

Annealing. The annealing processes were all performed on the dry bath incubator (Boekel Scientific, Feasterville, PA). The solution of mixed DNAs was heated to 95° C. for 15 min and gradually cooled down to room temperature for a period over 2 h. The annealed DNA complex solution was stored at −4° C.

Optimization of magnesium concentration for synthesizing DNA tetrahedron. 200 nM DNA 1, 2, 3, 4 and protector was added to 10 mM pH 8.0 Tris-HCl buffer with different concentrations of magnesium chloride and proceeded the annealing process, followed by further characterization.

Characterization of DNA tetrahedron. DNA tetrahedron was synthesized with DNA1, 2, 3, 4 and protector by an annealing process. 5% native polyacrylamide gel electrophoresis (PAGE) was involved in characterizing the formation of DNA tetrahedron. DNA sequencing system (model 4200, Fotodyne, Hartland, WI) was used to supply the constant direct current. The voltage was set at 80 V while the power should be less than 3 W for reducing the temperature rising. Normally, the electrophoresis could finish in 90 min.

Characterization of toehold-mediated displacement reaction with the fluorescence spectrometer. To 100 nM DNA tetrahedron, 10 nM target RNA and 100 μM capture DNA was added. TH-Mg buffer was used to set the volume to 100 μL. The reaction was kept at room temperature for 3 h in dark and the fluorescence was measured.

Optimization of the concentration of DNA tetrahedron in the reaction. To different concentration of DNA tetrahedron, 10 nM target RNA and 100 μM capture DNA was added. TH-Mg buffer was used to set the volume to 100 μL. The reaction was kept at room temperature for 3 h in dark place and the fluorescence was measured. Solution without target DNA or capture DNA or both were also measured as a control.

Optimization of the pH value in the reaction. To 100 nM DNA tetrahedron, 10 nM target RNA and 100 μM capture DNA was added. 10 mM Tris-HCl and 10 mM $Mg^{2+}$ buffer with different pH value were used to set the volume to 100 μL. The reaction was kept at room temperature for 3 h in dark and the fluorescence was measured. Analogous solution without target DNA was measured as a control.

Experimental setup for the fluorescence lifetime measurement. Fluorescence lifetime was measured using the time-correlated single-photon counting (TCSPC) technique. The excitation source was a fiber supercontinuum laser based on a passive modelocked fiber laser and a high-nonlinearity photonic crystal fiber supercontinuum generator (Fianium SC450-PP). The laser provides 6-ps pulses at a repetition rate variable between 0.1-40 MHz. The laser output was sent through an Acousto-Optical Tunable Filer (Fianium AOTF) to obtain excitation pulses at desired wavelength of 500 nm. Fluorescence emission was collected at a 90° geometry setting and detected using a double-grating monochromator (Jobin-Yvon, Gemini-180) and a microchannel plate photomultiplier tube (Hamamatsu R3809U-50). The polarization of the emission was set at 54.7° relative to that of the excitation. Data acquisition was done using a single photon counting card (Becker-Hickl, SPC-830). The typical IRF had a FWHM of 40 ps, measured from the scattering of sample at the excitation wavelength. The excitation power was kept at the repetition rate of 20 MHz. The data was fitted with a sum of exponential decay model globally or at a single wavelength using a home-written program ASUFIT.

Experimental setup for the single molecule detection. Single molecule detection was performed on the Nikon inverted TE2000-U microscope (Nikon Instruments Inc., Melville, NY). Krypton/argon laser (Melles Griot 35-KAP-431-208, IDEX Health & Science LLC., Carlsbad, CA) was used as excitation source for all experiments. The laser beam was reflected by a double dichroic mirror (514 nm/647 nm, Chroma Tech. Co., Bellows Falls, VT) and focused by a water immersion 60×/1.20 Plan-Apo objective lens (Nikon Instruments Inc., Melville, NY) to excite the samples on the cover glasses (Fisher Scientific International, Inc., Asheville, NC). Emitted Photons were collected by the same objective lens. The collected photons were then focused through a 100 micron confocal pinhole and filtered through a 525 nm long-pass emission filter. A single photon counting module (τ-SPAD, PicoQuant, Germany) detected the signal which was subsequently processed by a 6602 counter/timer module (National Instruments, Austin, TX). The power of the laser was set at 0.1 mW and the time of signal acquiring was 5 s to prevent from severe photobleaching of fluorescent organic dyes.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A DNA nanostructure comprising four DNA oligonucleotides, wherein the first oligonucleotide has the sequence of SEQ ID NO: 2, the second oligonucleotide has the sequence of SEQ ID NO: 3, the third oligonucleotide has the sequence of SEQ ID NO: 4, and the fourth oligonucleotide has a length of 30 to 80 nucleotides and comprises a sequence that is at least 95% complementary to a target viral nucleic acid sequence;
   wherein the DNA nanostructure is a DNA tetrahedron comprising five double-stranded edges and one single-stranded edge; and
   wherein the target viral nucleic acid sequence is a sequence from a virus selected from dengue virus, Ebola virus, human immunodeficiency virus (HIV), hepatitis B, hepatitis C, influenza, measles, Zika, yellow fever, West Nile fever, smallpox, Marburg viruses, human papillomavirus, Kaposi's sarcoma-associated herpesvirus, and human T-lymphotropic virus.

2. The DNA nanostructure of claim 1, wherein the single-stranded region comprises a first toehold domain, a hybridization region, and a second toehold domain, wherein:
   the first toehold domain is 4 to 15 nucleotides in length, and comprises a nucleic acid sequence that is complementary to a portion of the target viral nucleic acid;
   the hybridization region comprises a nucleic acid sequence that is complementary to a portion of the target viral nucleic acid; and
   the second toehold domain is 4 to 15 nucleotides in length, and does not hybridize to the target viral nucleic acid.

3. The DNA nanostructure of claim 1, further comprising a fluorophore or a quencher operably linked to the DNA nanostructure.

4. The DNA nanostructure of claim 3, wherein the fluorophore or a quencher is operably linked to the third oligonucleotide.

5. The DNA nanostructure of claim 1, wherein the fluorophore or quencher is operably linked to the 5' end of the third oligonucleotide.

6. The DNA nanostructure of claim 1, wherein the fluorophore or quencher is operably linked to the 3' end of the third oligonucleotide.

7. The DNA nanostructure of claim 1, wherein the tetrahedron further comprises a protector oligonucleotide hybridized to the fourth oligonucleotide, wherein:
   the protector oligonucleotide is 15 to 25 nucleotides in length;
   the protector oligonucleotide is operably linked to a fluorophore or a quencher; and
   the target viral nucleic acid is capable of displacing the protector oligonucleotide and hybridizing to the DNA tetrahedron.

8. The DNA nanostructure of claim 1, wherein the target nucleic acid is from Dengue virus.

9. A kit comprising:
   (a) a DNA nanostructure comprising four DNA oligonucleotides, wherein the first oligonucleotide has the sequence of SEQ ID NO: 2, the second oligonucleotide has the sequence of SEQ ID NO: 3, the third oligonucleotide has the sequence of SEQ ID NO: 4, and the fourth oligonucleotide has a length of 30 to 80 nucleotides and comprises a sequence that is complementary to a target viral nucleic acid;
       wherein the DNA nanostructure is a DNA tetrahedron comprising five double-stranded edges and one single-stranded edge; and
       wherein the target viral nucleic acid is from a virus selected from dengue virus, Ebola virus, human immunodeficiency virus (HIV), hepatitis B, hepatitis C, influenza, measles, Zika, yellow fever, West Nile fever, smallpox, Marburg viruses, human papillomavirus, Kaposi's sarcoma-associated herpesvirus, and human T-lymphotropic virus;
   (b) a protector oligonucleotide; and
   (c) a capture oligonucleotide;
   wherein:
   the protector oligonucleotide is 15 to 25 nucleotides in length, is capable of hybridizing to the fourth oligonucleotide; and is operably linked to a fluorophore or a quencher;
   the target viral nucleic acid is capable of displacing the protector oligonucleotide and hybridizing to the DNA tetrahedron; and
   the capture oligonucleotide is 15 to 30 nucleotides in length and is capable of displacing the target viral nucleic acid and hybridizing to the DNA tetrahedron, but is not capable of displacing the protector oligonucleotide.

* * * * *

SEQUENCE LISTING

<160> NUMBER OF SEQ ID NOS: 13

<210> SEQ ID NO 1
<211> LENGTH: 71
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
tgctcttccc gagatgcaag gtcgcatatg agcaactccc actcaactgc ctggtgatac    60
gaggatgggc a                                                         71

<210> SEQ ID NO 2
<211> LENGTH: 63
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
ggtgataaaa cgtgtagcaa gctgtaatcg acgggaagag catgcccatc cactactatg    60
gcg                                                                  63

<210> SEQ ID NO 3
<211> LENGTH: 63
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
aggcagttga gacgaacatt cctaagtctg aaatttatca cccgccatag tagacgtatc    60
acc                                                                  63

<210> SEQ ID NO 4
<211> LENGTH: 43
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
tcgattacag cttgctacac gattcagact taggaatgtt cgt                      43

<210> SEQ ID NO 5
<211> LENGTH: 17
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
agttgctcat atgcgac                                                   17

<210> SEQ ID NO 6
<211> LENGTH: 18
<212> TYPE: DNA
<213> ORGANISM: Artificial Sequence
<220> FEATURE:

<223> OTHER INFORMATION: Description of Artificial Sequence: Synthetic
      oligonucleotide

<400> SEQUENCE: 6
agttgctcat atgcgacc                                                      18

<210> SEQ ID NO 7
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
agttgctcat atgcgacct                                                     19

<210> SEQ ID NO 8
<211> LENGTH: 22
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
gggagttgct catatgcgac ct                                                 22

<210> SEQ ID NO 9
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
gggagttgct catatgcgac cttg                                               24

<210> SEQ ID NO 10
<211> LENGTH: 25
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
gggagttgct catatgcgac cttgc                                              25

<210> SEQ ID NO 11
<211> LENGTH: 20
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 11
cucauaugcg accuugcauc                                                    20

<210> SEQ ID NO 12
<211> LENGTH: 30
<212> TYPE: DNA
<213> ORGANISM: Artificial Sequence
<220> FEATURE:
<223> OTHER INFORMATION: Description of Artificial Sequence: Synthetic

```
        oligonucleotide

<400> SEQUENCE: 12
agatgcaagg tcgcatatga gcaactccca                                             30

<210> SEQ ID NO 13
<211> LENGTH: 20
<212> TYPE: DNA
<213> ORGANISM: Artificial Sequence
<220> FEATURE:
<223> OTHER INFORMATION: Description of Artificial Sequence: Synthetic
        oligonucleotide

<400> SEQUENCE: 13
ctcatatgcg accttgcatc                                                        20
```